United States Patent [19]

Hoover et al.

[11] Patent Number: 4,979,639
[45] Date of Patent: Dec. 25, 1990

[54] BEVERAGE DISPENSER CONTROL VALVE AND RATIO CONTROL METHOD THEREFOR

[75] Inventors: George H. Hoover, Marietta; Roger C. Whigham, Atlanta; Annie T. Ellis, Smyrna; Gary G. Highberger, Dunwoody, all of Ga.

[73] Assignee: The Coca-Cola Company, Atlanta, Ga.

[21] Appl. No.: 355,670

[22] Filed: May 23, 1989

[51] Int. Cl.[5] .............................................. B67D 5/00
[52] U.S. Cl. .................................... 222/1; 222/59; 222/63; 222/129.1; 222/129.4; 222/504; 137/87; 137/625.19; 364/479; 364/510
[58] Field of Search ................... 222/1, 52, 54, 55, 59, 222/63, 71, 129.1–129.4, 145, 484, 504; 137/87, 487.5, 625.19; 141/13; 364/479, 510; 307/228, 263

[56] References Cited

U.S. PATENT DOCUMENTS

| | | | |
|---|---|---|---|
| 4,008,829 | 2/1977 | Chandra et al. | 222/63 |
| 4,011,967 | 3/1977 | Halsey et al. | 222/129.4 |
| 4,019,653 | 4/1977 | Scherer et al. | 222/52 |
| 4,202,387 | 5/1980 | Upton | 222/54 |
| 4,220,998 | 9/1980 | Kays | 364/510 |
| 4,265,371 | 5/1981 | Desaij et al. | 222/129.4 |
| 4,341,327 | 7/1982 | Zeitz | 222/145 |
| 4,487,333 | 12/1984 | Pounder et al. | 222/129.4 |
| 4,494,209 | 1/1985 | Agarwal | 364/510 |
| 4,569,236 | 2/1986 | Kitchen et al. | 137/625.19 |
| 4,593,360 | 6/1986 | Cocks | 364/510 |
| 4,602,657 | 7/1986 | Anderson, Jr. et al. | 137/625.19 |
| 4,790,233 | 12/1988 | Backe et al. | 364/510 |
| 4,798,527 | 1/1989 | Gunda | 134/487.5 |
| 4,821,925 | 4/1989 | Wiley et al. | 222/129.4 |

Primary Examiner—Kevin P. Shaver
Assistant Examiner—Steven Reiss
Attorney, Agent, or Firm—Birch, Stewart, Kolasch and Birch

[57] ABSTRACT

A multiflavor beverage dispenser comprises a microprocessor system for controlling the ratio of diluent to concentrate of a post-mix beverage. The system includes a compact flow rate control module for selectively controlling the flow rates of liquids in a plurality of flow passages leading to nozzle assemblies of the dispenser. Each flow rate control module includes a single stepper motor connected to a rotary spool valve for selectively controlling the flow rate of the liquids. The microprocessor system utilizes variable reference signals which are ramped to approximately correspond to the actual flow rate of the liquid towards a target in order to reduce overshoot values of the flow rates. A scaling function is provided by the microprocessor system to adjust target flow rates between pours in order to achieve consistent controlled ratios of the beverage being dispensed.

24 Claims, 18 Drawing Sheets

AVERAGE POSITION OF WATER VALVE (VSW) (% OPEN)

| AVERAGE POSITION OF FLAVOR VALVE (VF) (% OPEN) | 0-20 % | 21-40 % | 41-60 % | 61-80 % | 81-100 % |
|---|---|---|---|---|---|
| 0-20 % | + STEP | + STEP | + STEP | NO STEP | − STEP |
| 21-40 % | + STEP | + STEP | + STEP | NO STEP | − STEP |
| 41-60 % | + STEP | + STEP | + STEP | NO STEP | − STEP |
| 61-80 % | + STEP | + STEP | + STEP | NO STEP | − STEP |
| 81-100 % | + STEP | + STEP | + STEP | NO STEP | − STEP |

NO STEP = STABLE STATE
+ STEP = INCREMENT FLOW
− STEP = DECREMENT FLOW

*FIG. 17*

BEVERAGE DISPENSER CONTROL VALVE AND RATIO CONTROL METHOD THEREFOR

BACKGROUND OF THE INVENTION

1. Field of the Invention

The present invention relates to a multiflavor beverage dispenser including a flow-rate control valve assembly and a microprocessor control system for controlling the ratio of diluent to concentrate of a post-mix beverage.

2. Description of Background Art

Multiflavor beverage dispensers, including microprocessors for providing ratio control of diluent to concentrate of post-mix beverage are generally known. An example of such a multiflavor beverage dispenser is disclosed in U.S. Pat. No. 4,487,333, issued Dec. 11, 1984 to Pounder et al.

Although the system of Pounder functions quite well for its intended purposes, a need in the art exists for a more compact apparatus with improved accuracy for ratio control, especially under conditions where the variation in system performance keeps the desired flow rate of the post-mix beverage from being reached.

SUMMARY OF THE INVENTION

Accordingly, it is a primary object of the present invention to provide a multiflavor beverage dispenser with means for controlling the ratio of diluent to concentrate of a post-mix beverage for any desired flow rate of the beverage.

It is another object of the present invention to provide a beverage dispenser which accurately controls the ratio of diluent to concentrate, even when various components of the system vary in performance in such a way that the desired flow rate of the beverage is never achieved.

It is a further object of the present invention to provide a flow rate control system for liquid flowing through a conduit which prevents any overshoots of the flow rates of liquid flowing through the conduit when liquid flow in the conduit first begins in order to avoid any inaccuracies in the controlled flow rate in the conduit flow rates. It is yet another object of the present invention to prevent any such overshoot of concentrate or diluent in a post-mix system so that controlled ratios may be achieved even for short pour times, or during topping-off operations for filling a cup with beverage.

It is still another object of the present invention to provide an improved flow rate control valve assembly structure wherein a single stepper motor associated with a single valve element, may control the flow rate of liquid in a plurality of conduits, which are to be selectively operated one-at-a-time.

It is still a further object of the present invention to provide a compact flow rate valve assembly structure which controls the rate of flow of liquid, senses the flow rate of the liquid, and measures the temperature of liquid in a plurality of substantially parallel liquid flow conduits.

The objects of the present invention may be fulfilled by providing, in combination with a multiflavor beverage dispenser nozzle assembly, a flow rate control assembly for selectively controlling a flow rate of a plurality of liquids comprising:

a plurality of flow passages for the plurality of liquids;

a common bore intersecting each of the flow passages;

a movable valve element in the bore having a plurality of flow channels therethrough, one channel for each flow passage, the channels being alignable in controlled degrees with the flow channels between fully aligned (open) and fully unaligned (closed) positions;

a single motor for moving the channels of the valve element in the controlled degrees between the fully aligned (open) positions and the fully unaligned (closed) positions to control the flow rate of liquid through each passage;

a valve in each of the flow passages having an open position and a closed position for initiating or stopping flow, respectively, in the associated passage; and a selector for opening one of the valves in the respective flow passages and closing the others to enable the single motor and valve element in the common bore to control the flow rate of liquid in the flow passage having the open valve therein.

The ratio control system of the present invention is implemented by a microprocessor and associated software in combination with the multiflavor dispenser apparatus and the above-described flow rate control assembly. The microprocessor and software, in combination with the flow rate control assembly, together form a system for dispensing a mixture of concentrate and diluent of a controlled ratio at or near a selected flow rate from a mixing means comprising:

concentrate supply conduit means in fluid communication with said mixing means;

diluent supply conduit means in fluid communication with said mixing means;

concentrate sensor means for determining the actual flow rate of concentrate in said concentrate supply conduit means and generating a concentrate flow rate signal;

diluent sensor means for determining the actual flow rate of diluent in said diluent supply conduit means, and generating a diluent flow rate signal;

target signal generator means for generating target flow rate signals for the concentrate and the diluent in the respective conduit means, the concentrate and diluent flow rate signals being determined from the selected flow rate of the mixture at given ratios of diluent to concentrate of the mixture;

reference signal generator means for generating variable reference flow rate signals associated with each of the concentrate flow rate and diluent flow rate;

comparator means responsive to said concentrate flow rate sensor means and said diluent flow rate sensor means for comparing each of the concentrate and diluent flow rate signals in the respective conduit means with the associated variable reference flow rate signals, and generating concentrate and diluent error signals indicative of the differences between concentrate and diluent flow rate signals and the respective associated variable reference flow rate signals;

concentrate flow rate control means responsive to said concentrate error signal for changing the actual concentrate flow rate in the concentrate supply conduit means toward a value equal to the variable reference flow rate reference signal associated with the concentrate flow rate until the concentrate error signal equals approximately zero;

diluent flow rate control means responsive to said diluent error signal for changing the actual diluent flow rate in the diluent supply conduit means toward a value equal to the variable reference flow rate associated with the diluent flow rate until the diluent error signal equals approximately zero;

adjusting means for gradually varying each of the variable reference flow rate signals associated with the concentrate flow rate and diluent flow rate toward the respective target flow rate signals thereof; and scaling means for scaling up or down the target flow rates of the concentrate and diluent to values consistent with the controlled ratio, and causing the reference adjusting means to adjust the variable reference signals upward or downward if either the average value of the concentrate error signals or the average value of the diluent error signals during a specified time period exceed defined limits, whereby a controlled ratio of concentrate and diluent will be dispensed even if the selected flow rate of the mixture is not consistently achieved.

BRIEF DESCRIPTION OF THE DRAWINGS

The objects of the invention and the attendant advantages thereof will become more readily apparent by reference to the drawings, wherein like numerals refer to like parts and, wherein:

FIG. 17 is a matrix of average motor positions for a given pour used for scaling target flow rates.

DESCRIPTION OF PREFERRED EMBODIMENTS

Figure 1:
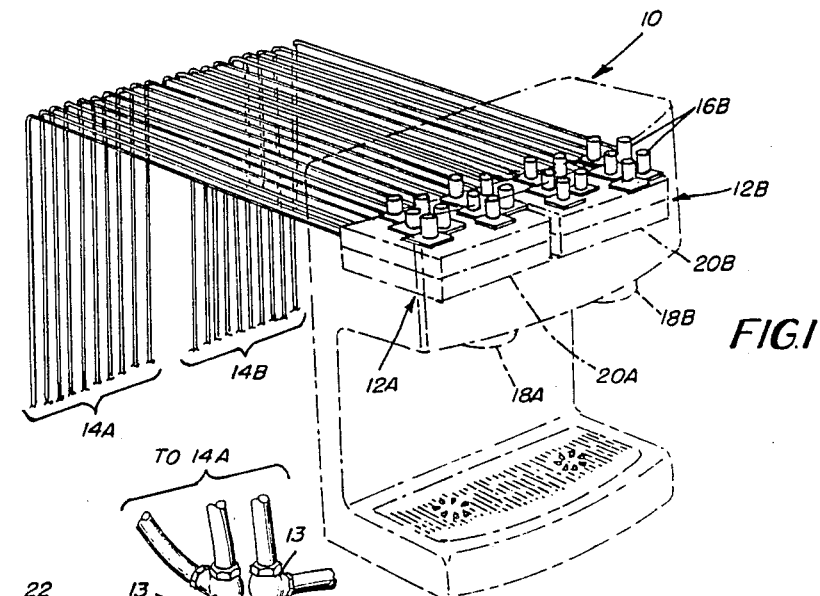
FIG. 1 is a diagrammatic perspective view of a multiflavor beverage dispenser tower and associated flavor nozzle assemblies of the present invention.

Referring in detail to FIG. 1 there is illustrated a multiflavor dispensing tower 10 having two flavor nozzle assemblies 12A and 12B. Each of these assemblies includes a solenoid block 20A, 20B, ten solenoid valves 16A, 16B and nozzles 18A, 18B. There are ten fluid conduits 14A running to nozzle assembly 12A and ten fluid conduits 14B running to nozzle assembly 12B. Each of the groups of conduits 14A and 14B includes six syrup conduits, two still water conduits and two soda (carbonated) water conduits. Accordingly, each of the nozzle assemblies 12A and 12B is capable of dispensing soft drinks of six different flavors, carbonated or uncarbonated, still water alone or carbonated water alone. Each nozzle assembly 12A, 12B is completely independent of the other. Details of this nozzle assembly are disclosed in patent application Ser. No. 307,663, filed Feb. 6, 1989, by Roger Chris Whigham and Annie Thomas Ellis, and assigned to the same assignee of the present invention. The details of that application are incorporated herein by reference.

Figure 2:
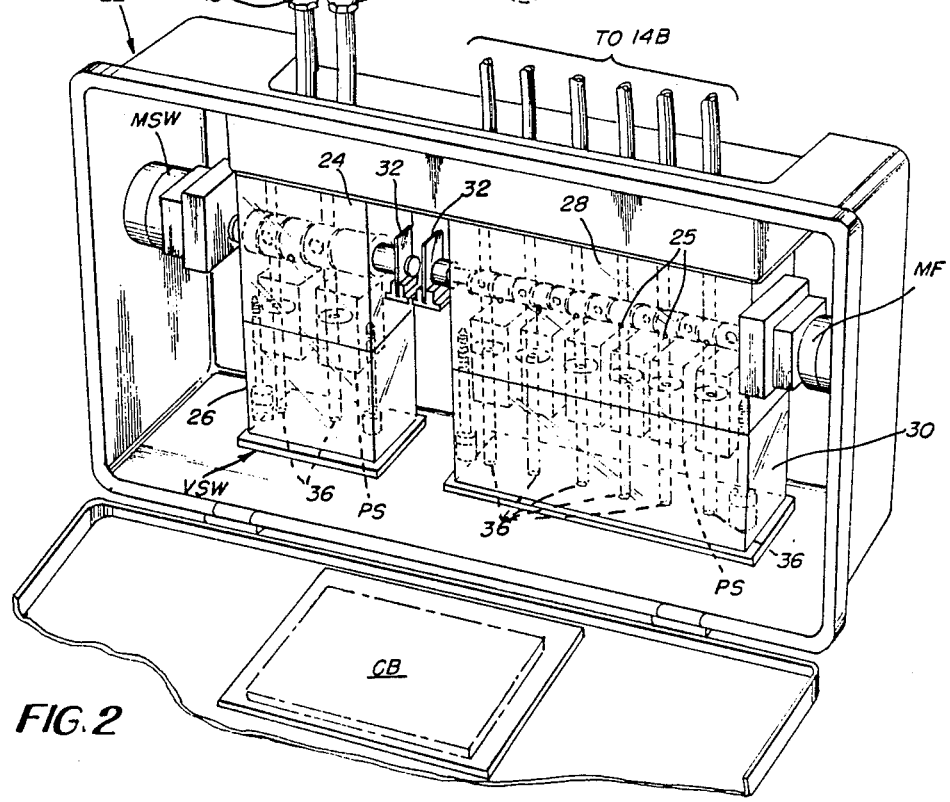
FIG. 2 is a perspective view of a flow rate control module of the present invention, which controls the flow rate of still water or soda water and flavor concentrate (syrup) to the beverage dispenser tower of FIG. 1.
Figure 3:
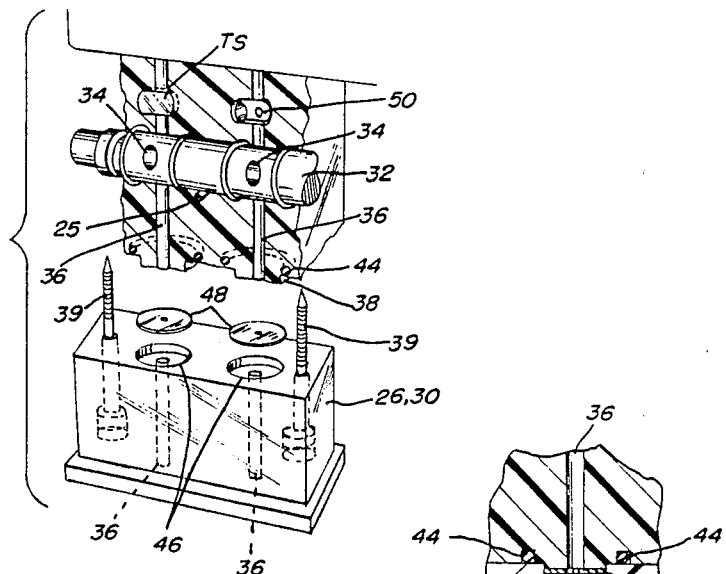
FIG. 3 is a fragmentary view, partially in section, of a portion of the flow rate control module of FIG. 2.
Figure 4:
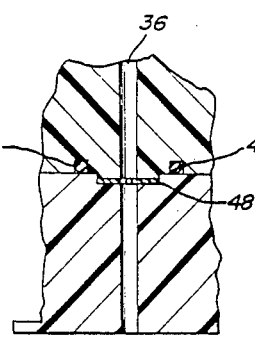
FIG. 4 is a sectional view of a fragmentary portion of the flow rate control module of FIG. 2 illustrating the manner in which a flow rate sensing orifice disk is sandwiched between upper and lower portions of the module housing.

Referring in detail to FIGS. 2 to 4, there is illustrated a flow rate control module of the present invention which is provided for controlling the rate of flow of syrup and water in the liquid conduits 14 under the direction of a microprocessor in order to achieve the proper ratio of water (still or carbonated) to syrup for each flavor of soft drink dispensed by nozzle assemblies 12A or 12B. FIG. 2 discloses only one flow rate control module which for the purposes of illustration is connected to liquid conduits 14A as shown by like numerals in the respective figures. Preferably the beverage tower 10 is placed on a countertop and the flow rate control module of FIG. 2 is disposed in a cabinet 22 beneath the countertop.

The front door of the cabinet 22 has a control circuit board CB including a microprocessor disposed on the inside of the door. Details of this control circuit board CB will be described hereinafter with reference to the circuit schematic of FIG. 8. The control module includes a water valve assembly VSW and a flavor valve assembly VF within the cabinet 22. Water valve assembly VSW is driven by a variable speed rotary stepper motor MSW such as a model no. 1T82800 manufactured by Airpax Corp. The stepper motor drives a rotary valve spool 32 having one end attached to the motor MSW and a distal end journaled in bracket 32. Likewise valve control assembly VF includes a similar type of stepper motor MF which drives a similar type of valve spool 32 which has one end journaled in a bracket 34 and the opposite distal end connected to the motor MF.

The respective valve assemblies are essentially identical in construction with the exception that assembly VSW contains only two vertically disposed fluid flow passages 36 for still water and soda water while the valve assembly VF contains six vertical parallel passages or bores for the six flavors of syrup to be dispensed. In this regard the parallel bores 36 in the valve assembly VSW are in fluid communication with the Y-connectors 13 in order to split each of the still water and soda water lines into two lines which are fed to the nozzle assembly 12A. This is done in order to compensate for pressure fluctuations in the still water or soda water lines.

Figure 5:
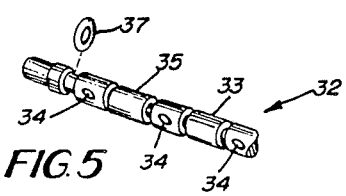
FIG. 5 is a perspective view of a valve spool used in the flow control module of FIG. 2.

The detailed construction of the valve assemblies VSW and VF can be better understood by reference to the fragmentary cross-sectional view of FIG. 3 in conjunction with the views of FIGS. 4 and 5. It can be seen that the valve spool 32 rotates within a horizontal bore in an upper block 24 or 28 and the bore in which spool 32 rotates intersects vertical, parallel bores 36. Upper blocks 24 and 28 are respectively screwed to lower blocks 26 and 30 by screws 39, and sandwiched therebetween are flow restricting orifice discs 48 in counterbore portions 46 male members 38 in the top blocks 24 and 28 fit into counterbores 46 and sandwich the flow restricting orifices therein. An 0-ring 44 prevents leakage or flavor crossover between the respective parallel bores 36.

Preferably disks 48 are fabricated of stainless steel and have the following dimensions:

For the syrup (flavor) lines,

| OD | 0.447" ± 0.002" |
|---|---|
| ID | 0.100" ± 0.002" |
| thickness | 0.003" |

For the water or soda lines,

| OD | 0.560" ± 0.002" |
|---|---|
| ID | 0.215" ± 0.002" |
| thickness | 0.003" |

Spool valve 32 includes groove portions 33, land portions 35 and passages 34 therethrough. An 0-ring 37 is disposed in each of the grooves 33 to again prevent flavor crossover between respective bores 36. As can been seen from FIGS. 2 to 4 as the spool valve elements 32 are incrementally stepped to different angular positions passages 34 therein become aligned, or unaligned, by varying degrees with passages 36. In the position shown in FIG. 3 all passages 36 are closed. On the other hand, as spool 32 is rotated so that passages 34 align with passages 36 the rate of flow through passages 36 and spool element 32 can be varied depending on whether or not passages 34 and 36 are in full registry (a fully opened condition) or partial registry (a range of incremental positions between a fully closed and a fully open state). When the spool is in a fully closed position such as indicated in FIG. 3, this is considered a "HOME" position which will be described further hereinafter.

Figure 6:
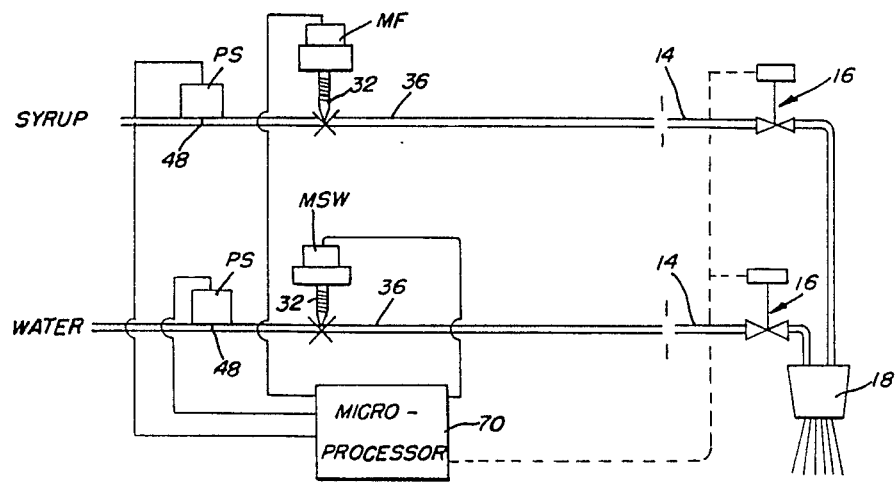
FIG. 6 is a diagrammatic illustration of one of six syrup lines and one of two water lines illustrating the operation of the flow rate control module, the flow rate control sensors, and a microprocessor for providing a controlled ratio of water to syrup in the beverage dispensed from nozzle 18 in accordance with the principles of the present invention.

Another important aspect of the flow rate control module of FIG. 2 can be best understood by reference to FIGS. 4 and 6 in conjunction with FIG. 2. On the back side of each of the valve assemblies VSW and VF are differential pressure sensors PS associated with each of the respective vertical bores 36 and associated orifice discs 48. These pressure sensors may be a model no. MPX2050 Temperature Compensated, 0 to 7.3 PSI differential pressure sensors manufactured by Motorola, Inc.

A pair of small bores perpendicular to passages 36 extend through the block walls of the valve assemblies into fluid communication with opposites sides of the pressure sensors PS. These small bores are disposed on opposite sides of the orifice disc 88 as indicated in the diagrammatic view of FIG. 6. The differential pressure sensed by these sensors PS is proportional to the fluid flow rate through the passages 36 and is used as control signals fed into the microprocessor to control the energization of motors MF, MSW and the associated valve spools 32 which they drive. The details of this control function will be described in detail hereinafter.

The unique valve assembly structures VSW and VF make it possible to use only one valve spool for both the still water and soda water line for each respective nozzle assembly; and only one valve spool for the six flavor lines of each respective nozzle assembly. This is possible because each of the conduits 14 extending to the nozzles 18 includes a solenoid valve 16 therein. Accordingly, although every respective bore 36 of the valve assemblies VSW and VF open or close to the same degree in unison, each conduit 14 to which the passages 36 are connected is individually controlled by a flavor solenoid 16. Therefore, the flow rate of a given conduit 36 is only controlled if its associated solenoid valve 16 is open at the time. This unique valve assembly structure is extremely compact and performs many functions including the function of controlling the flow rate of liquid therethrough in the respective bores, sensing the flow rate with the pressure transducer PS and sensing the temperature of the liquids in the respective bores 36 using the temperature sensors TS disposed in recesses 50 as illustrated in FIG. 3.

Bleed holes 25 are formed in upper blocks 24, 28 in fluid communication with the transverse bores 31, in which the spools 32 rotate, between the respective vertical bores 36. These bleed holes are provided in the event that 0-rings 37 on spool 32 should fail, thereby preventing flavor crossover between the bores 36.

Figure 7:
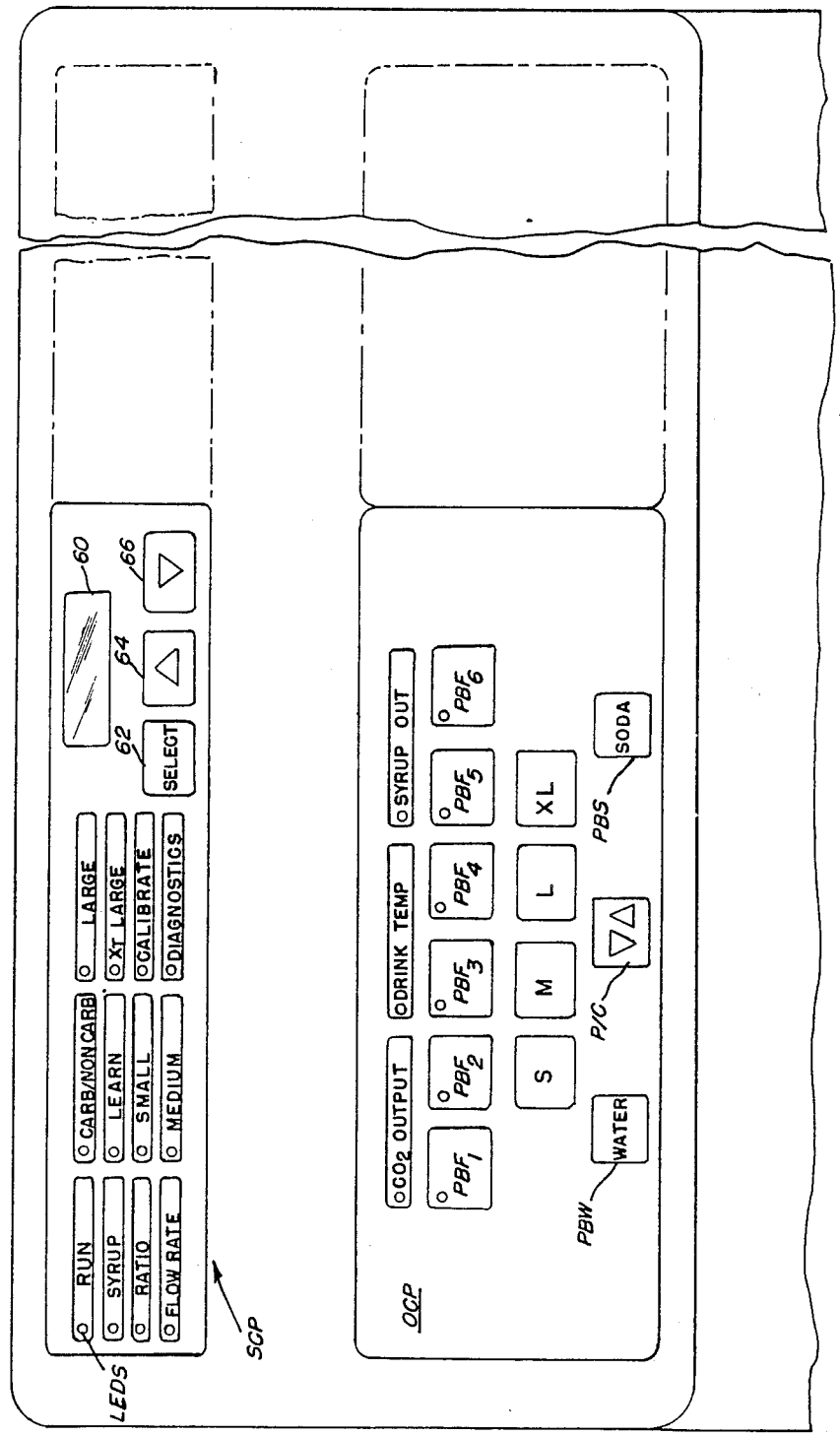
FIG. 7 is a fragmentary view of a portion of a control panel on the face of the dispensing tower of FIG. 1.

The beverage dispensing tower of the present invention has a control panel on the face thereof illustrated in FIG. 7. The upper portion of the control panel SCP is provided for programming the system and the lower portion OCP is for use by the operator of the dispenser such as a sales clerk in a fast food restaurant for pouring selected drinks. The dispensing tower uses a microprocessor to monitor operator push buttons, liquid flow rate and liquid temperatures, and to control the solenoid valves 16, indicator lights and liquid flow control valve assemblies VSW and VF.

The upper portion of the control panel SCP includes a series of LEDs disposed in columns adjacent to the legends "Run", "Syrup", "RATIO", "Flow Rate", "Carb/Noncarb", "Learn", "Small", "Medium", "Large", "XT Large", "Calibrate", "Diagnostics". Panel SCP also includes a numerical display 60 which is a four digit numeric display, a select button 62, an increment button 64 and a decrement button 66. In operation the user depresses select button 62 which causes the LEDs to begin sequencing from the "Run" legend downwardly in that column, and thereafter in a similar fashion in each adjacent column thereafter for each actuation of a select button. In other words, select button 62 is utilized to scroll the LEDs and the adjacent functions indicated on the control panel until the desired function has been reached. When the desired function has been reached, the increment 64 is actuated to increase the numeric display on display 60 to the desired value or the decrement button 66 is actuated to decrease the numeric display on display 60.

The purpose of the control panel SCP is to permit a service person or user to program the beverage dispensing for each flavor so that the microprocessor will have the information it needs to properly control the mixture ratio, portion size, and flow rate. Examples that the operator must program for each flavor are:

Syrup type
Target flow rate
Target mixture ratio
Small portion size
Medium portion size
Large portion size
Extra Large portion size
Carbonated or Noncarbonated Water So for example, if one wishes to program that a small portion size has four ounces, one would push select button 62 until the LED adjacent to "Small" was illuminated; and would push the increment or decrement buttons 64 or 66 as necessary to show a display of 4 on display 60. Other programming would be achieved in a similar fashion and the details of such will become more apparent with reference to the software flow charts of FIGS. 9 to 15 and their associated descriptions. The lower control panel OCP is utilized to initiate and control pouring of a beverage. The panel includes a series of flavor selection push buttons PBF1, PBF2, PBF3, PBF4, PBF5 and PBF6 for the six respective flavors for each nozzle assembly 12. Since FIG. 7 is only a fragmentary view of a control panel, the necessary controls for only one of the nozzle assemblies such as 12A is illustrated. Just above the flavor push buttons are warning lights with associated legends "CO2 output/input", "drink temp", "syrup out". The warning lights are again, preferably LEDs. These legends and associated warning lights indicate trouble conditions in the system. The panel OCP also includes portion size push buttons "S", "M", "L" and "XL" to indicate small, medium, large and extra large portions, respectively. In addition, there is a "water" push button PBW for dispensing water only and a "soda" push button PBS for dispensing soda only. A "pour cancel" switch P/C is also provided if it is desired that an initiated pour be stopped at any given time.

During the pouring routine, the operator chooses what flavor will be dispensed by pushing a given one of the flavor selection push buttons PBF. The microprocessor then illuminates a LED associated with that flavor push button confirming the operator's flavor selection. Once a flavor is selected, the operator pushes a size button small, medium, large or extra large which will initiate the pour. The microprocessor may also illuminate a LED adjacent to the size button actuated confirming the operator's size selection. In the embodiment illustrated in FIG. 7 these LEDs' are not shown. The microprocessor reads the key status and controls the LEDs status by way of a serial bus made up of shift registers to be described in connection with FIGS. 8. Errors in reading the keyboard are minimized by requiring that the microprocessor receive two identical transmissions before acting on the keystrokes sensed.

Once a flavor and size have been selected, the microprocessor checks the memory to verify that the flavor selected has not been flagged as being sold out. If the flavor is available, the microprocessor opens the appropriate syrup and water solenoids 16 and begins the close loop control of the liquid flow rates to be described hereinafter in conjunction with the flow charts of FIGS. 9 to 15. The microprocessor is connected to the solenoids 16 through latches optical isolators and triac drivers indicated in FIGS. 8. The latch is located at a unique memory address. The microprocessor addresses the solenoid latch as it would any other memory address and writes desired solenoid state to the latch. Three bits drive the water solenoids in a recirculating pump relay by way of inverters, opto isolators and triacs. The other three bits are decoded by a three-line address decoder. The decoder drives buffers and opto isolators which drive triacs which control the solenoids 16.

Figure 8A:
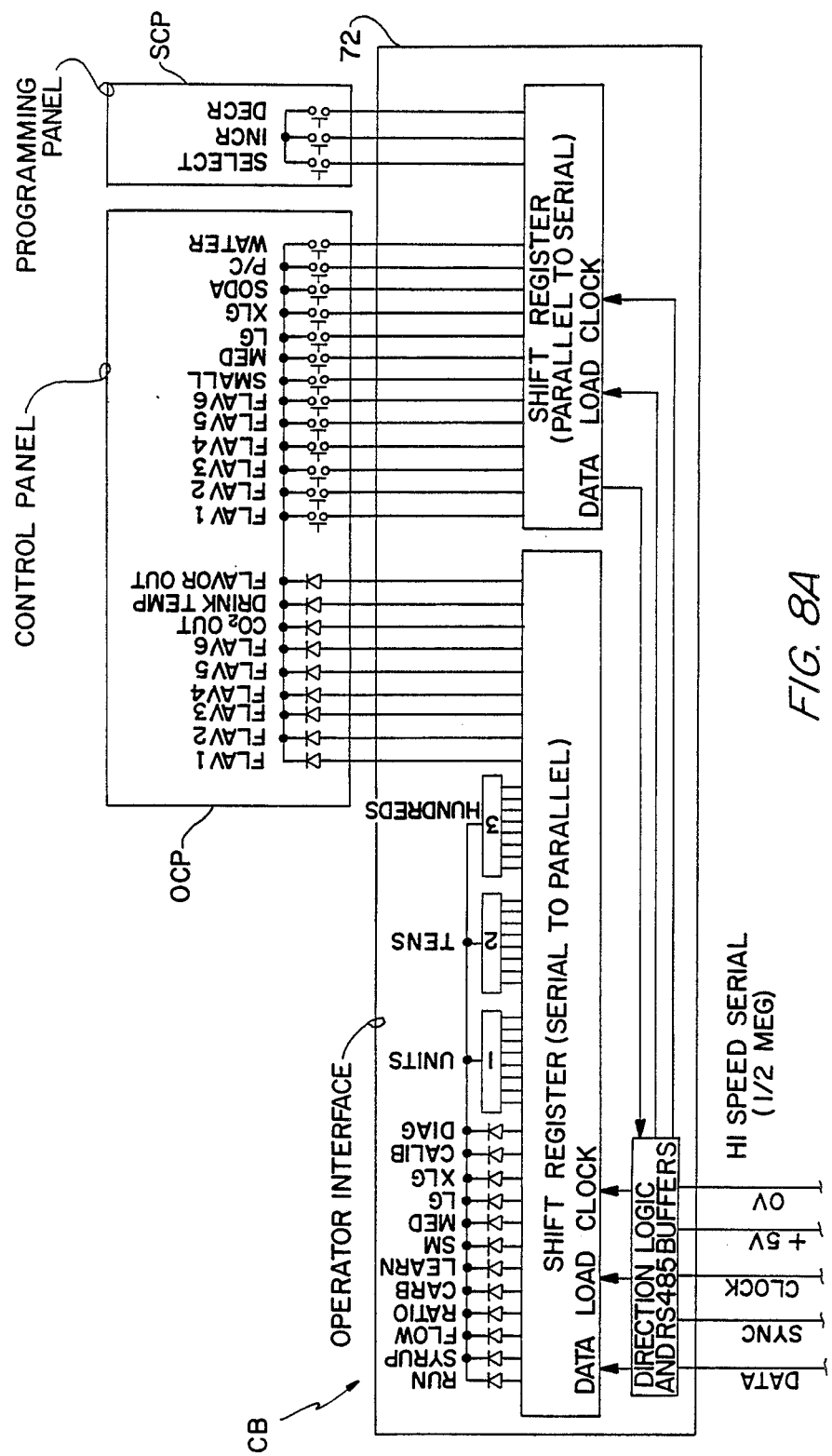
FIGS. 8A, 8B, and 8C are a circuit schematic of the microprocessor and associated interface circuitry for operating the system of the present invention.
Figure 8B:
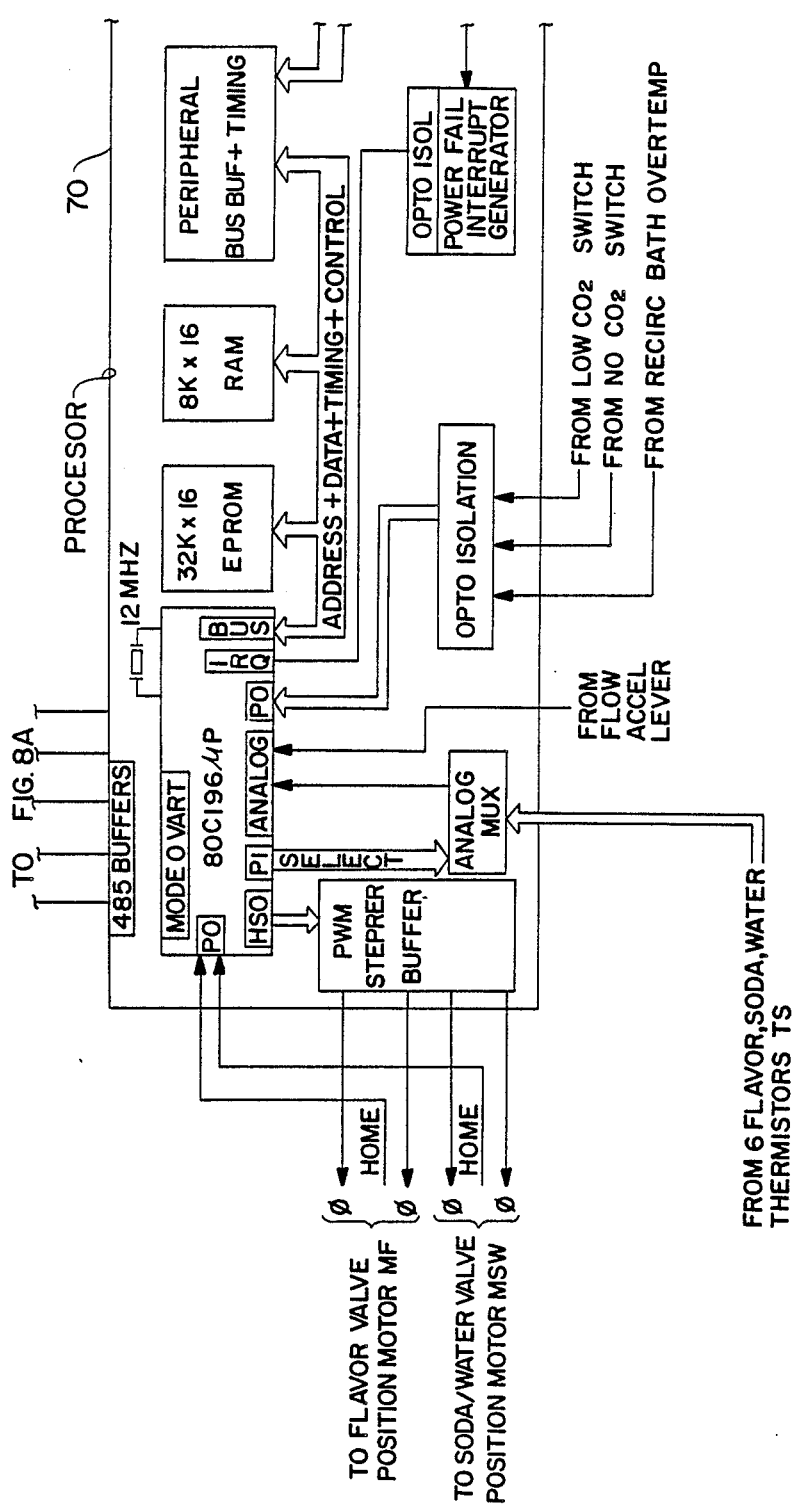
Figure 8C:
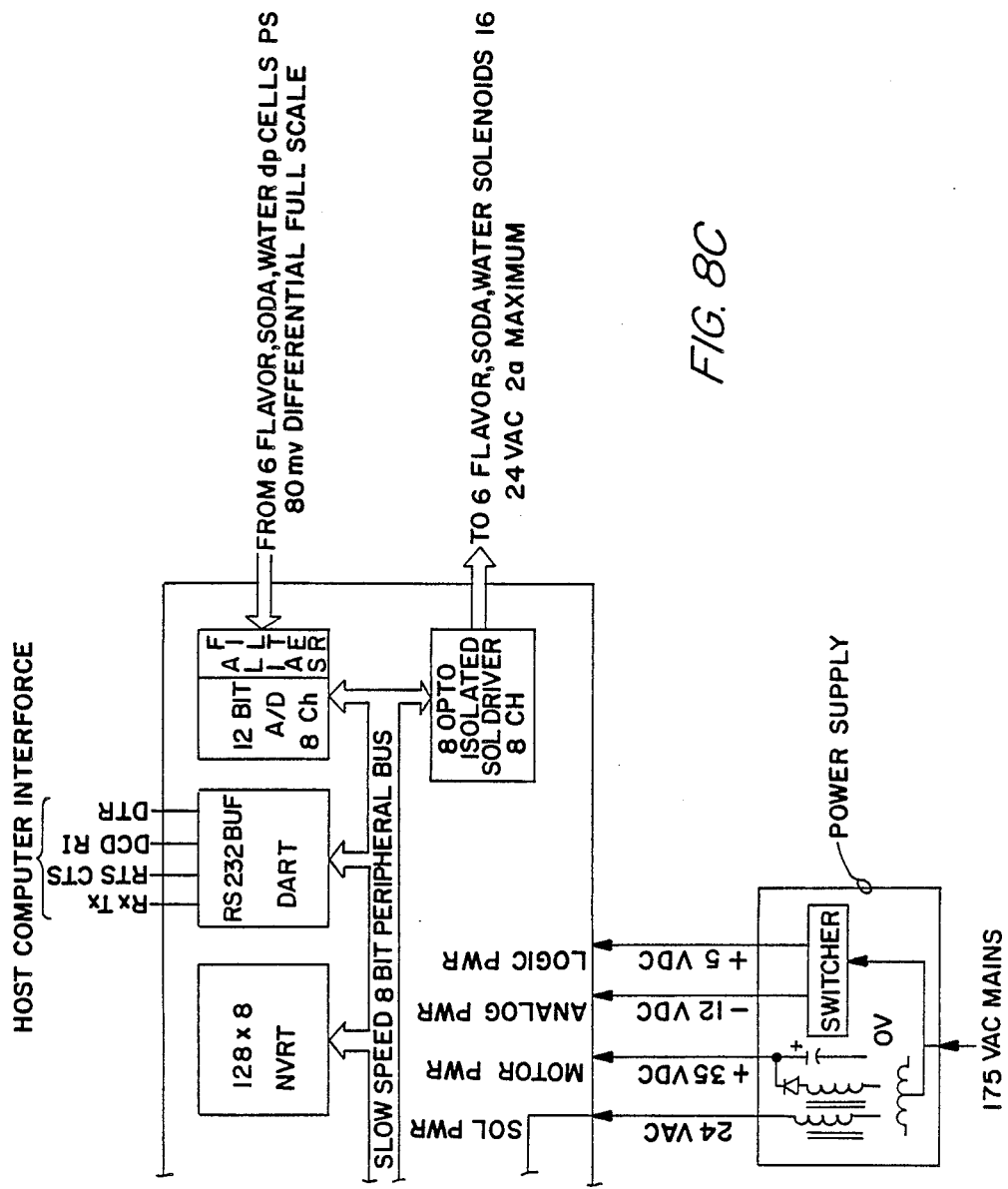

Referring to FIGS. 8 there is illustrated a circuit schematic of a circuit board CB of the present invention including microprocessor 70 which may be an Intel 80C196. The microprocessor 70 is interfaced to the control panel OCP and programming panel SCP via operator interface circuitry 72 including appropriate shift registers and logic buffers which are self explanatory in the illustration. As illustrated the microprocessor 70 includes the main CPU chip as well as an EPROM, RAM, "peripheral bus buffer and timer", a NVRAM, a "UART" leading to an input/output computer interface and series of opto isolators.

The CPU outputs control signals $\phi A$, $\phi B$ and "HOME" signals to the respective flavor valve position motor MF and the soda/water valve position motor MSW. The CPU also drives the PWM (pulse width modulation) stepper buffer to generate the signals $\phi A$, $\phi B$. Signals from the six flavor buttons on the soda water and still water buttons and thermistors TS are input through an analog multiplexor to the CPU. Other inputs include an input from a "flow accelerator lever", input from the low $CO_2$, no $CO_2$, and recirculation bath over temperature sensors through an opto isolator in order illuminate the LED's adjacent to the associated legends on control panel OCP.

Additional inputs to the microprocessor 70 are supplied from the six flavor, one soda and one water differential pressure sensing cells PS through a filter and a twelve bit analog to digital convertor having eight input channels. The operation of the circuit of FIGS. 8 should be more clearly apparent from the foregoing description of FIGS. 1 to 7 and following description of the software in the flow charts of FIGS. 9-15.

DESCRIPTION OF FLOW CHARTS FOR SOFTWARE

FIGS. 9 through 15 are the flow charts for the software for operating the microprocessor and associated circuitry of FIGS. 8. Before describing these flow charts in detail, a general summary of the operation of the software for providing a closed loop ratio control routine will be described.

The closed loop control is responsible for controlling the ratio of water to syrup, the portion size and the flow rate. Based on information programmed by the operator at installation, the microprocessor calculates the target flow rate for water and syrup based on the desired ratio, and the desired total flow rate. Once the target water and syrup flow rates have been calculated, the microprocessor begins ramping (gradually increasing) the reference flow rates stored in the microprocessor up to the target flow rate value. The microprocessor is continuously comparing the actual flow rate as measured by orifice flow meters (PS and orifice plates 48), to the reference flow rate. The difference, or error signal, is integrated two times, once in the software and once in the hardware. The output of the second integrator (or motor) is a position signal that is fed to the stepper control valve VSW or VF to either open or close it depending on whether the error signal is positive or negative.

The adaptive scaling routine is responsive for increasing or decreasing the target flow originally programmed by the operator, depending on delivery capability of the fluid supply. The routine uses the valve position as the feedback signal for the scaling conrol. If either valve is open excessively, then the delivery capability is insufficient and the target flow is reduced. On the other hand, if either valve is closed excessively, the delivery capability is ample and the target flow rate is increased. The target flow rate is, however, never increased beyond the flow rate originally programmed. If both valves are at a nominal operating point, then the target flow rate is not changed. The invention presently uses a 5×5 matrix in conjunction with the valve position to implement the adaptive control algorithm. See FIG. 17. The soda and flavor average valve positions are each quantized into one of (but not limited to) five zones (0-20%, 21%-40%, 41%-60%, 61%-80%, 81%-100%). 9% corresponds to fully closed and 100% to fully open. The water average valve position thereby selects one of five columns and the flavor similarly selects one of five rows of the matrix resulting in the selection of the adaptive flow error. If the error is zero, then the target flow is stable and is not changed, if the error is positive then the target flow is too low and is increased, and finally if the error is negative, the target flow is too high and is decreased. An important property of the matrix is the inclusion of several strategically plazed zero error cell entries corresponding to physically stable flow rates to prevent continually hunting between a lesser and a greater flow rate. The adaptive control matrix is referred to in algorithm 9 as ADAPT (row, col).

If the microprocessor has scaled down the flow rate due to inadequate supply of water or syrup, the microprocessor will record this in a stack of data that can be reviewed by a service agent and the microprocessor will wink the light adjacent to the flavor button to indicate there is a problem with that flavor. The microprocessor integrates the total drink flow in the software. The output of this integrator is the volume that has been dispensed. When the volume integrator value equals the desired portion size, the microprocessor closes the water and syrup solenoid valves and then closes the water and syrup control valves so that they will be ready to ramp up for the next pour.

The actual flow rate is determined from the sharp-edged orifice meter including differential pressure sensors PS and associated orifice discs 48. Orifice meters are placed in each of the conduits 36 including those for syrup, water and soda. Each orifice meter as described in the foregoing description of FIGS. 5 and 6 includes a sharp-edged orifice in disc 48 mounted in a straight section of pipe, namely vertical bores 36. Pressure taps or bores are drilled through the valve control blocks into the bores 36 at positions upstream and downstream of the orifice and disc 48. A differential pressure sensor PS is connected to the pressure taps in positions indicated in FIGS. 2 and 6. The differential pressure signal is amplified and fed into an analog multiplexer of FIG. 8 so the microprocessor can select one of the differential pressure sensors to read. There are also temperature sensors TS in recesses 50 of the valve block as illustrated and described hereinbefore with respect to FIG. 3. The temperature sensor generates a temperature signal which is also fed into the multiplexer. Temperature of the liquids is measured because the viscosity of the liquid affects the differential pressure to flow rate relationship. The microprocessor contains a lookup table that gives flow rate based on differential pressure, syrup temperature, and syrup type.

Each stepper is driven by two RIFA integrated circuits designed to control stepper motors (PWM stepper buffer of FIGS. 8). The integrated circuit pair receives three signals from the microprocessor.
1. Chip enable—this allows the stepper to be turned off during idle time, minimizing power consumption.
2. Phase A—this signal is one of the two phase quadrature signals necessary by each motor which the chip amplifies to drive the motor winding.
3. Phase B—this signal is the other phase quadrature signal.

Phase A leading Phase B causes motor rotation to open the valve and Phase A lagging Phase B causes motor rotation to close the valve.

There are two stepper motors as illustrated above in FIGS. 2 and 6 namely a stepper motor MSW and a flavor stepper motor MF.

The microprocessor and associated circuitry of FIGS. 8 in conjunction with the software of FIGS. 9 to 13 also maintains a history of sales information and extensive diagnostic information in its volatile memory. The information can be downloaded to a computer for analysis through a modem (see hoset computer interface of FIG. 8).

An intrinsic property of the type II controller used in the present invention (type II meaning the error is integrated twice) is regulation to not only a target but also to the time integral of the target. The invention uses this property to permit simultaneous control of flow ratio (regulation to the target) and of portion size (regulation to the time integral of target) with a minimum of complexity.

Figure 16A:
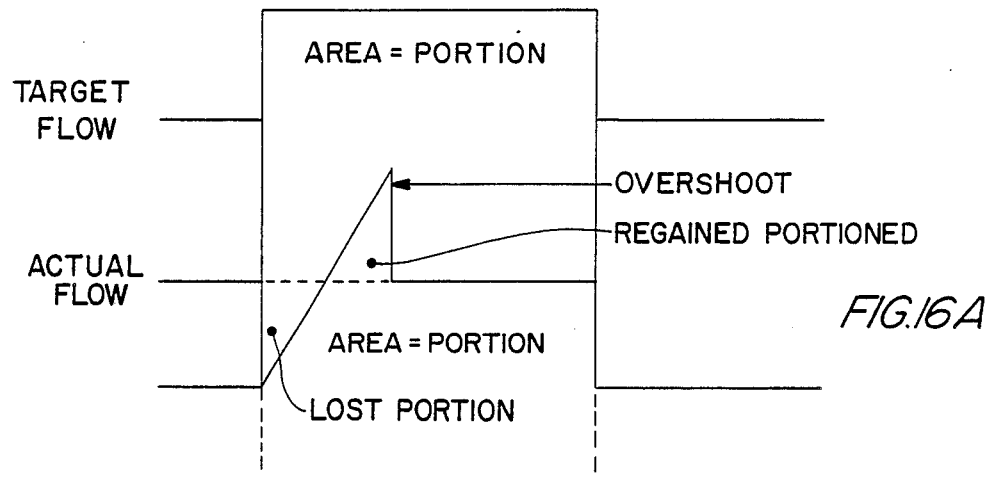
FIGS. 16A and 16B are graphs explaining reference signal rampings.

A particularly important feature of the present invention is the ramping of the reference signals, namely, the target flow rates of the respective syrups and water to achieve a selected ratio. Without ramping, the unit will open the solenoids 16 and control valves VSW, VF immediately trying to reach the target flow rate. The actual flow rate will be below the target flow rate at the beginning of a pour as the control valve opens. The actual flow rate will then have to "overshoot" the target flow rate to make up for the lower than target rate at the beginning of the pour. See FIG. 16A.

With ramping, the unit will still open the solenoids and open the control valves, but the reference flow rate will ramp up to the target flow rate. Since the actual flow rate also "ramps" due to opening of the control valve, the actual rate should not have to "overshoot" as much as in the case without ramping.

Figure 16B:
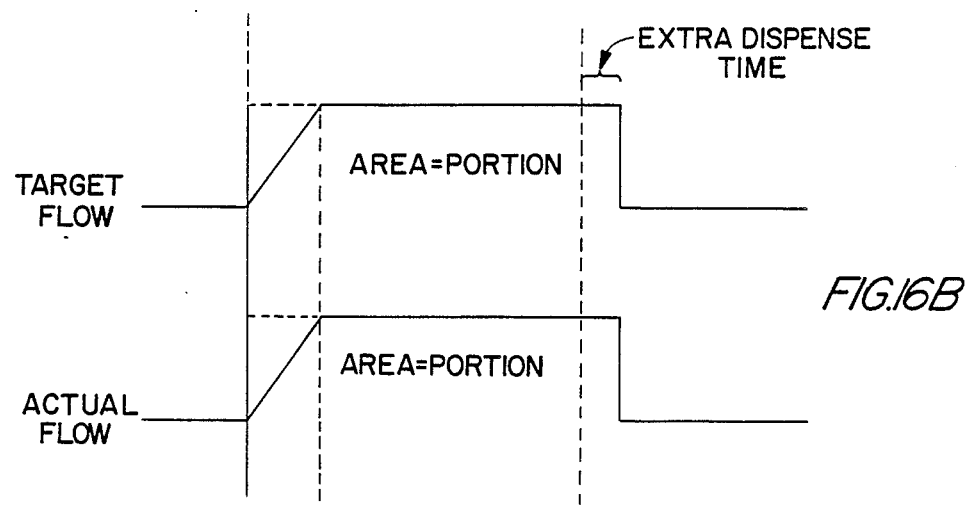

The dispense time to deliver a given quantity of beverage will be slightly longer in the ramping mode but the advantages of ramping outweigh this small time increase. In a short time pour, the ramping technique should be more accurate in terms of ratio control. The exact method of ramping may vary. Ramping may be from any given flow rate to the target flow rate. An alternative scheme would be to ramp from some percentage of the target (say 50%) to the target flow rate. The slope of the ramp may also vary depending on the type of fluid and the associated conduit sizes and other related parameters. See FIG. 16B.

Figure 9A:
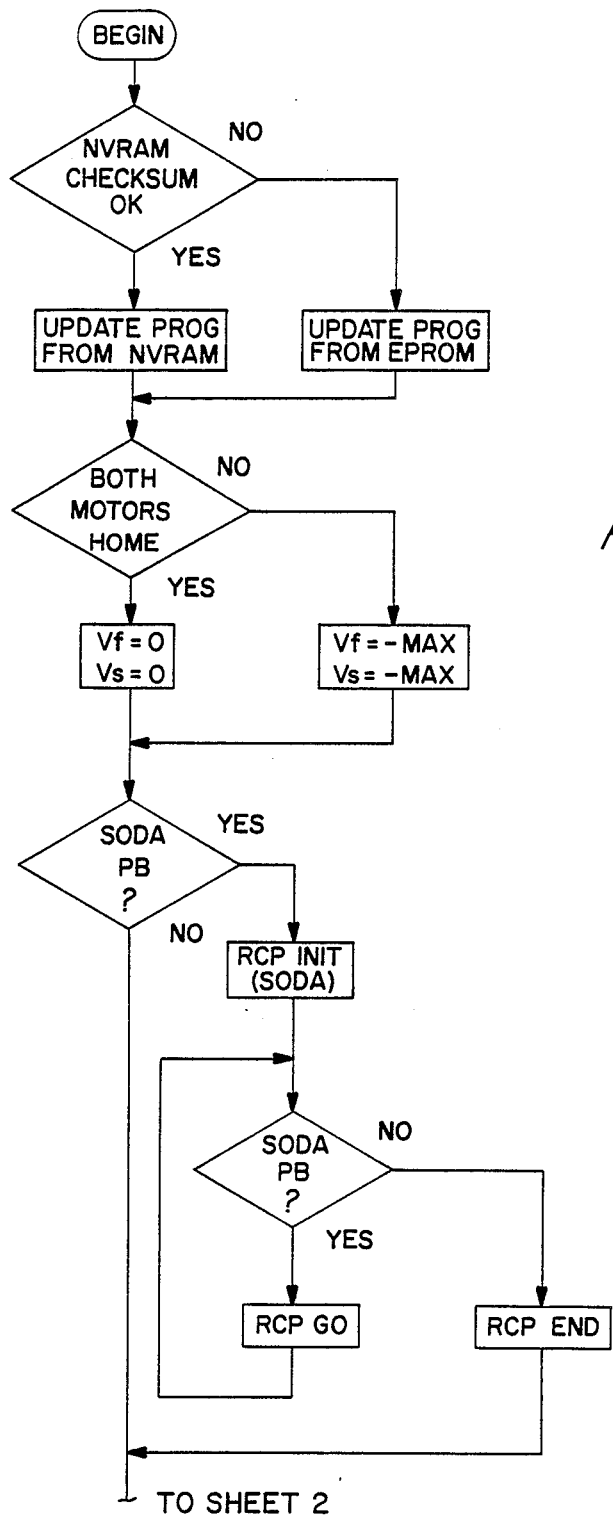
FIGS. 9 to 15 are flow charts of the software utilized to operate the microprocessor in the circuit schematic of FIGS. 8A and 8B.
Figure 9B:
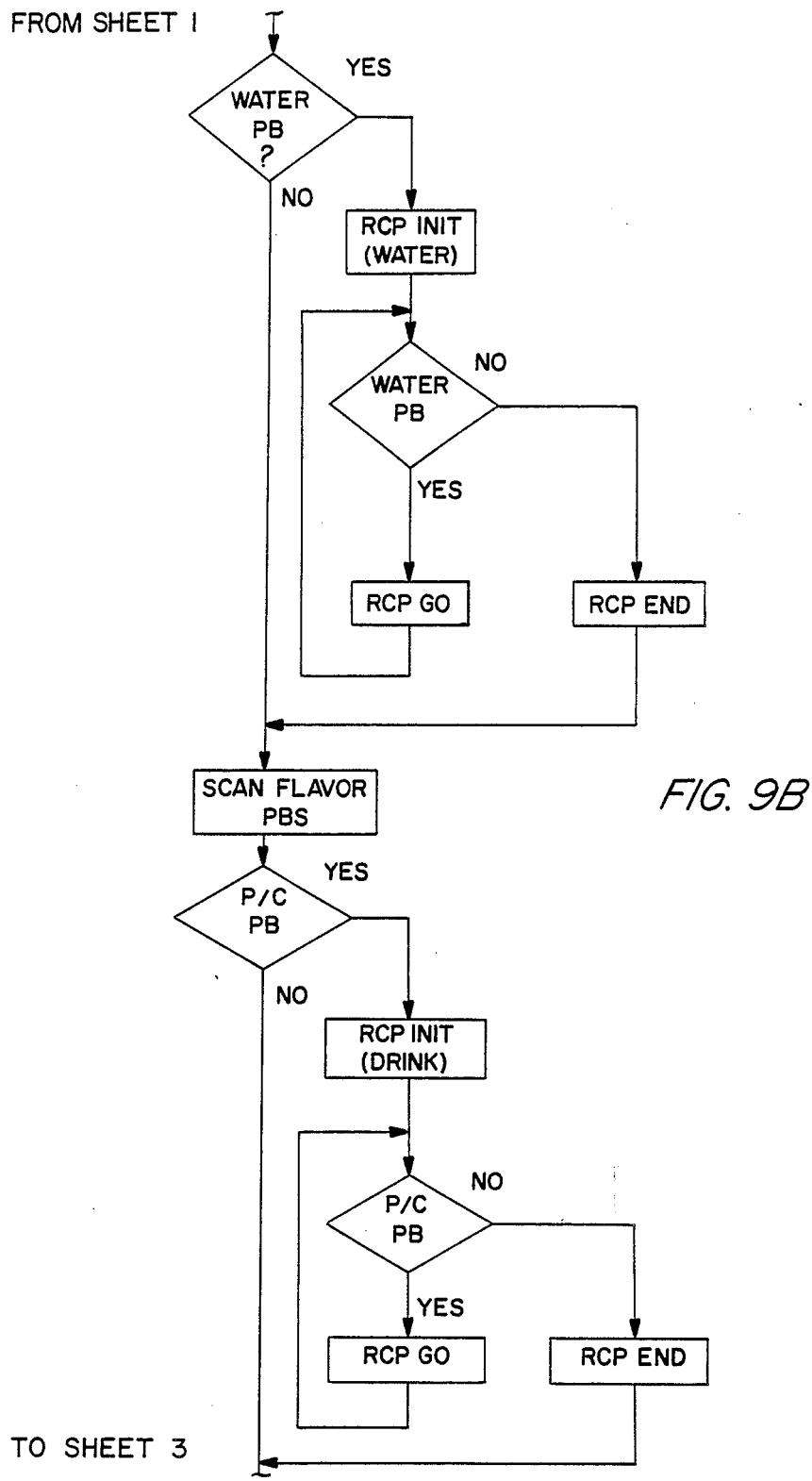

The operation of the system of the present invention may now be better understood by reference to the flow charts of FIGS. 9 to 15. In FIG. 9 an initialize routine begins with a decision block "NV RAM Check Sum Okay". If the decision is no, the routine proceeds to the block labeled "Update Prog from EPROM" where the program and the EPROM of FIGS. 8 is updated. If the answer is yes, the routine proceeds to the block "Update Prog from NVRAM" where the program and the NVRAM is updated. The routine continues on to the decision block "Both Motors Home". This block asks if the motors MSW and MF are both in the home positions, namely, the closed positions of the associated spool valves 32. If the answer is no, these motors will be rotated in the negative direction toward a fully closed position at maximum speed as indicated by the legends in the block "Vf=−MAX and VS=−MAX". If both motors are in the home position, the routine proceeds on and the velocity Vf of the flavor motor and the velocity V8 of the water motors is zero. The next step in the routine is the decision block "SODA PB?". In this decision block the software asks if the soda push button PBS in FIG. 7 has been pushed. If the answer is yes the routine proceeds to the block "RCP INT (SODA)". At this point in the routine a ratio controlled pour is initialized in the system. The routine proceeds to the decision block "SODA PB?" to determine if the soda push button switch PBS is still actuated. If the answer is no the ratio controlled pour comes to an end, and if the answer is yes the ratio controlled pour proceeds to GO as indicated by the block "RCP GO".

Returning to the first "SODA PB" decision block if the answer was no, the routine proceeds to the decision block marked "WATER PB?". The control loop with respect to this decision block is essentially the same as the one with respect to the soda decision block, so no further description is required. The routine then goes on to scan the flavor push button switches PBF indicated in FIG. 7 as illustrated by the legend "SCAN FLAVOR PBS". The next decision block in the routine in FIG. 9 is "P/C PB". In this decision block the question is asked whether or not the pour cancel switch P/C of FIG. 7 has been depressed. If the answer is yes, the routine proceeds on to a step "RCP INIT (DRINK)" wherein the ratio control pour routine with respect to each particular flavor is initialized. Once again a decision block "P/C PB" is provided to see if the push button for pour cancellation is actuated. If not, the ratio controlled pour routine ends, and if so, the ratio controlled pour routine proceeds to GO.

Figure 10A:
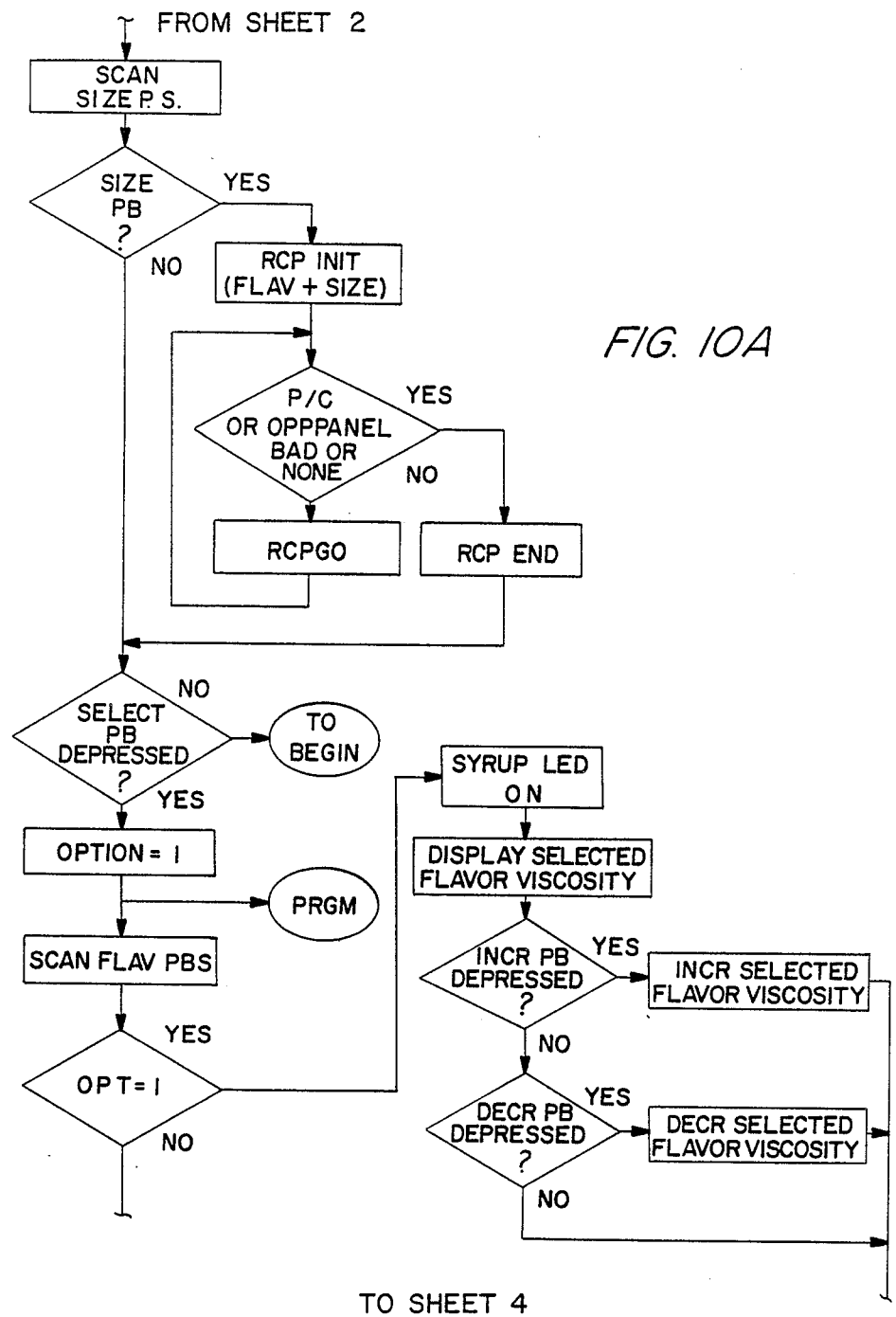
Figure 10B:
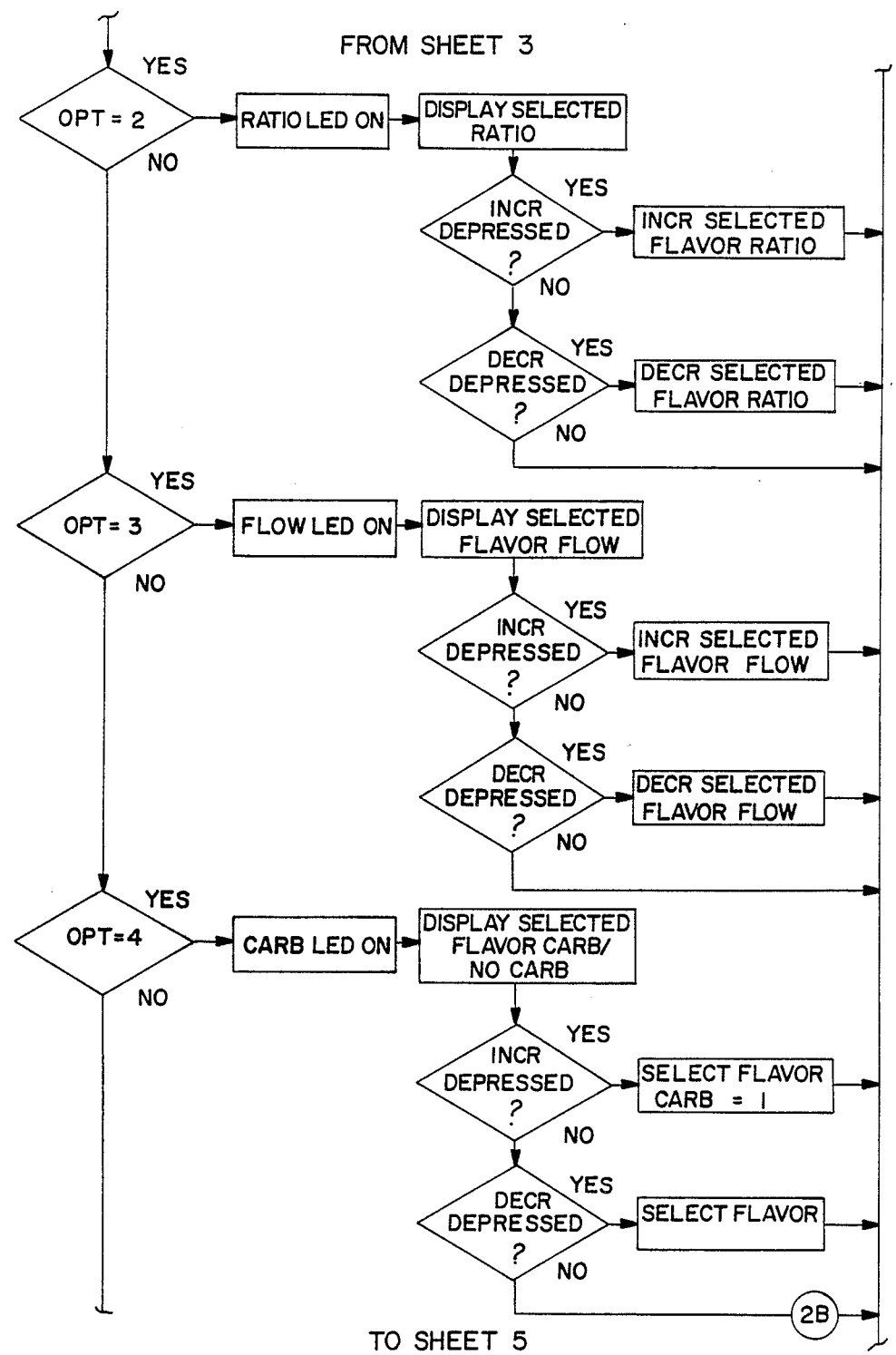

The software routine then proceeds on to the flow chart of FIG. 10 and the first step thereof labeled "SCAN SIZE PS". The size push button switches S, M, L and XL in FIG. 7 are scanned. At this juncture of the routine the size push buttons are initialized in a similar manner to the push button switches of the proceeding subroutines. The routine goes on to the decision block "select PB depressed?"

At this point in the routine if the select button 62 of the control panel SCP of FIG. 7 is depressed the routine goes on to the programming options of the legends illustrated on control panel SCP. If button 62 is not depressed the routine returns to the beginning of the initialization program in FIG. 9.

Figure 11A:
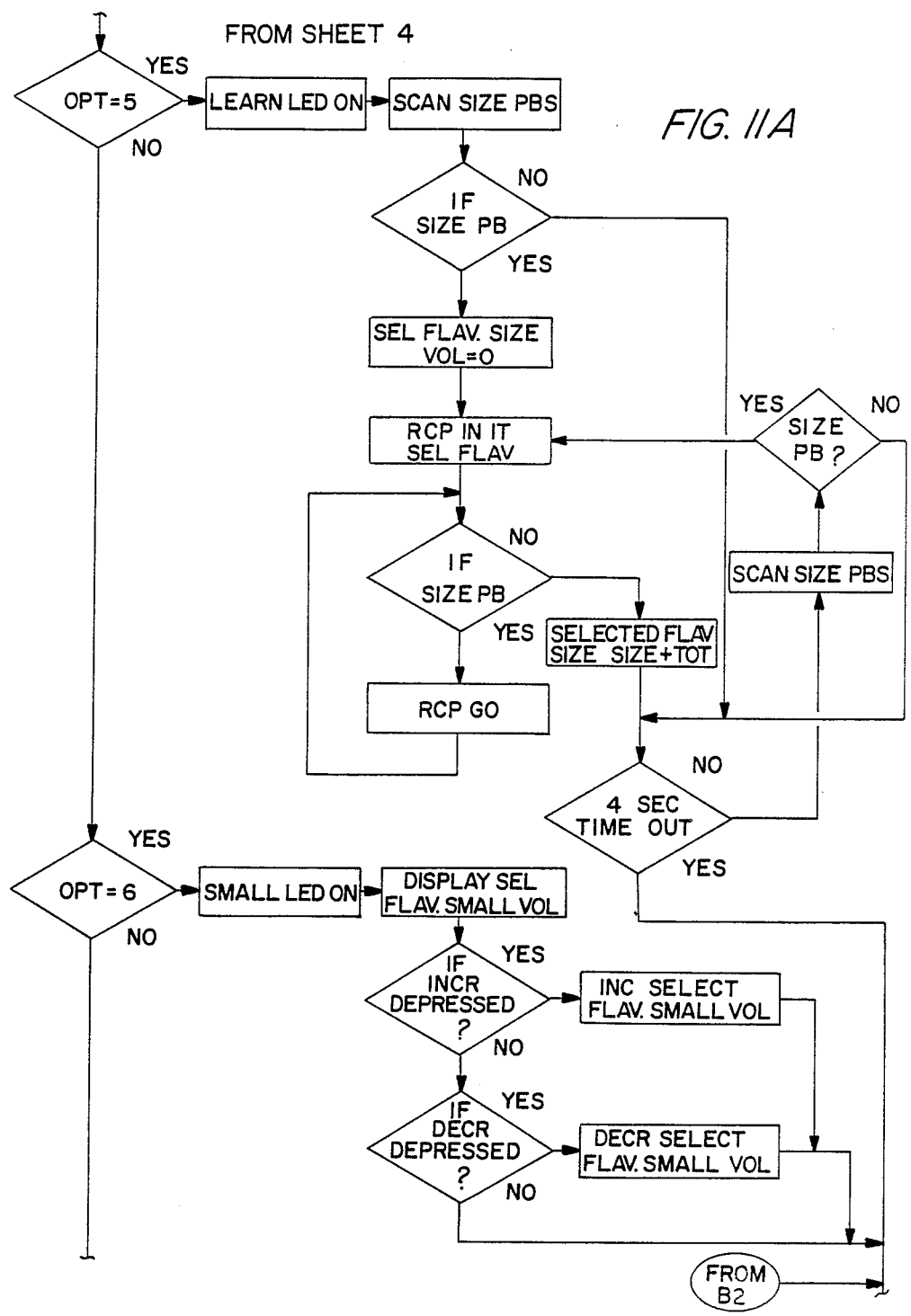
Figure 11B:
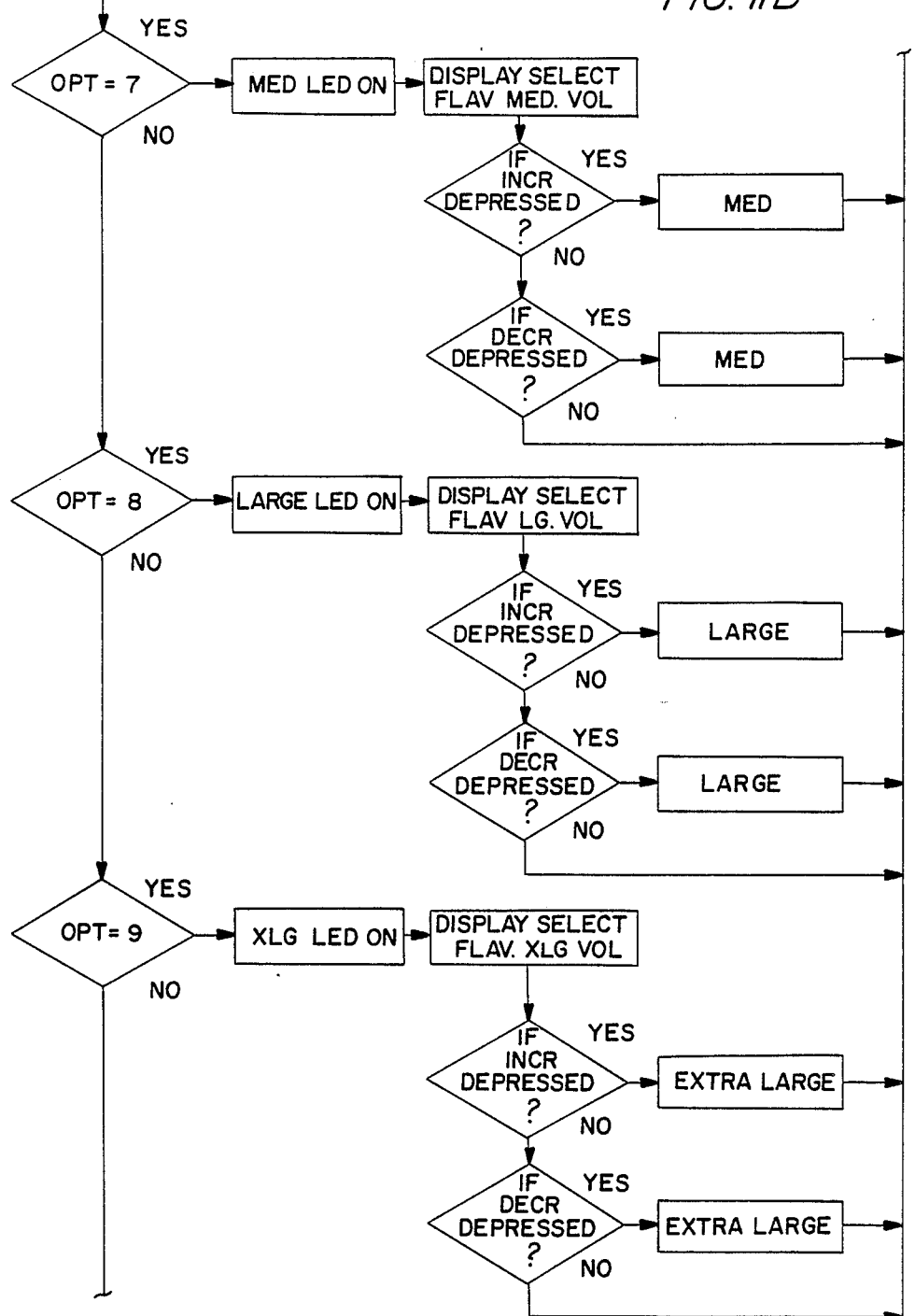
Figure 12A:
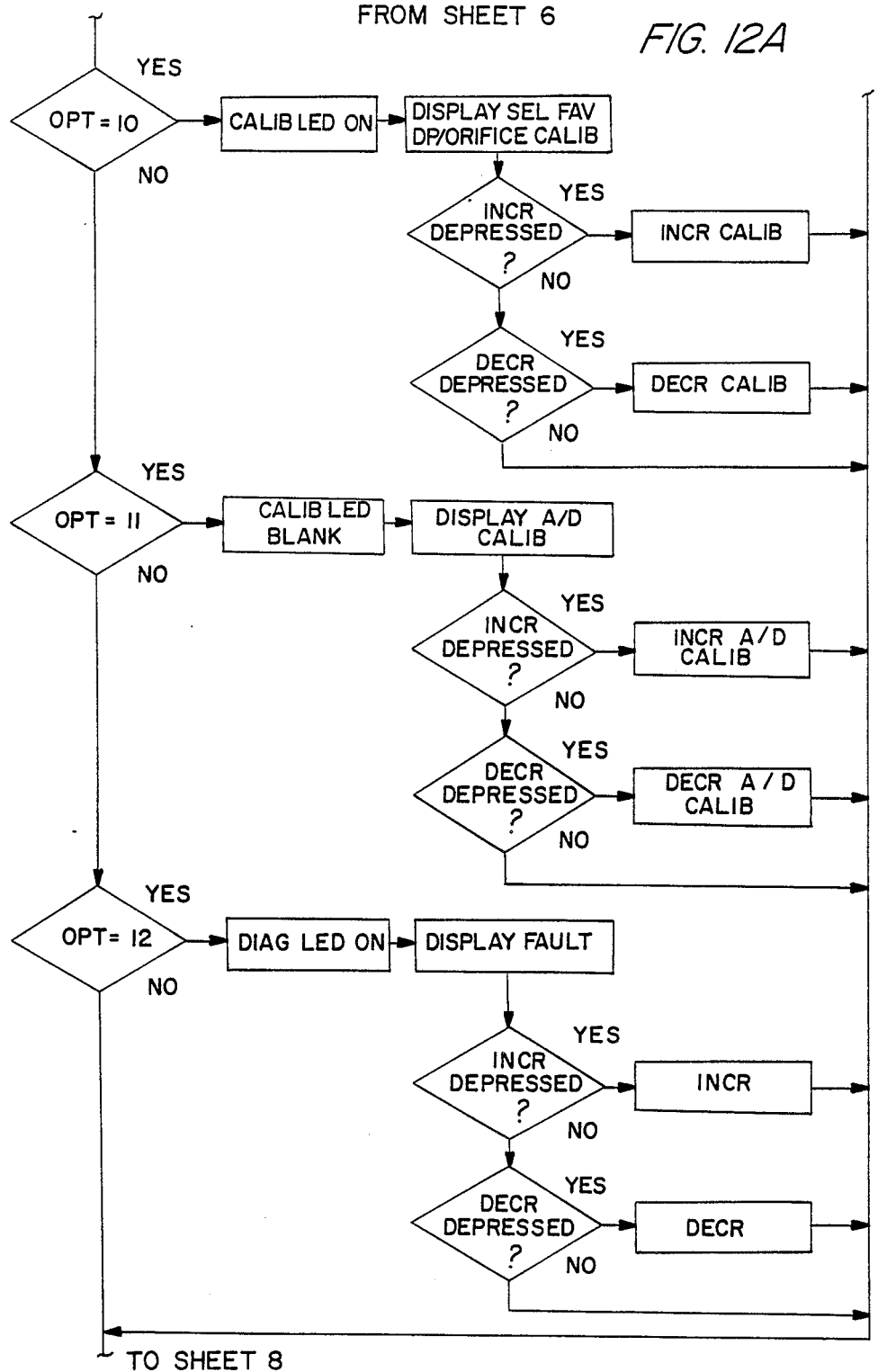
Figure 12B:
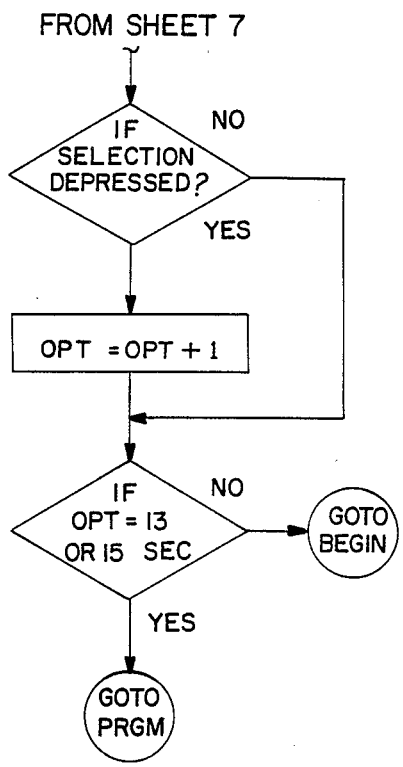

The programming subroutines extend from this point through FIGS. 11 and 12. It can be seen that the programming options are listed as OPT 1 to 12. This designation refers to the following associated program functions:

OPT 0=RUN
OPT 1=SYRUP
OPT 3=RATIO
OPT 4=FLOW RATE
OPT 5=CARB/NON
OPT 6=LEARN
OPT 7=SMALL
OPT 8=MEDIUM
OPT 9=LARGE
OPT 10=X SUB T LARGE
OPT 11=CALIBRATE
OPT 12=DIAGNOSTICS

The above-identified programming subroutines are very similar so only exemplary routines will be described hereinafter. For example, in subroutine OPT =1, namely, the "SYRUP" subroutine select button 62 has been actuated in order to illuminate the LED adjacent "SYRUP" and the display 60 displays numerical data representative of selected flavor viscosity. In order to adjust this numerical data on display 60 either increment button 64 or decrement button 66 are actuated in order to increase or decrease the selected flavor viscosity, respectively. Subroutines OPT 2-4 and 6-12 proceed in a similar fashion.

Figure 13:
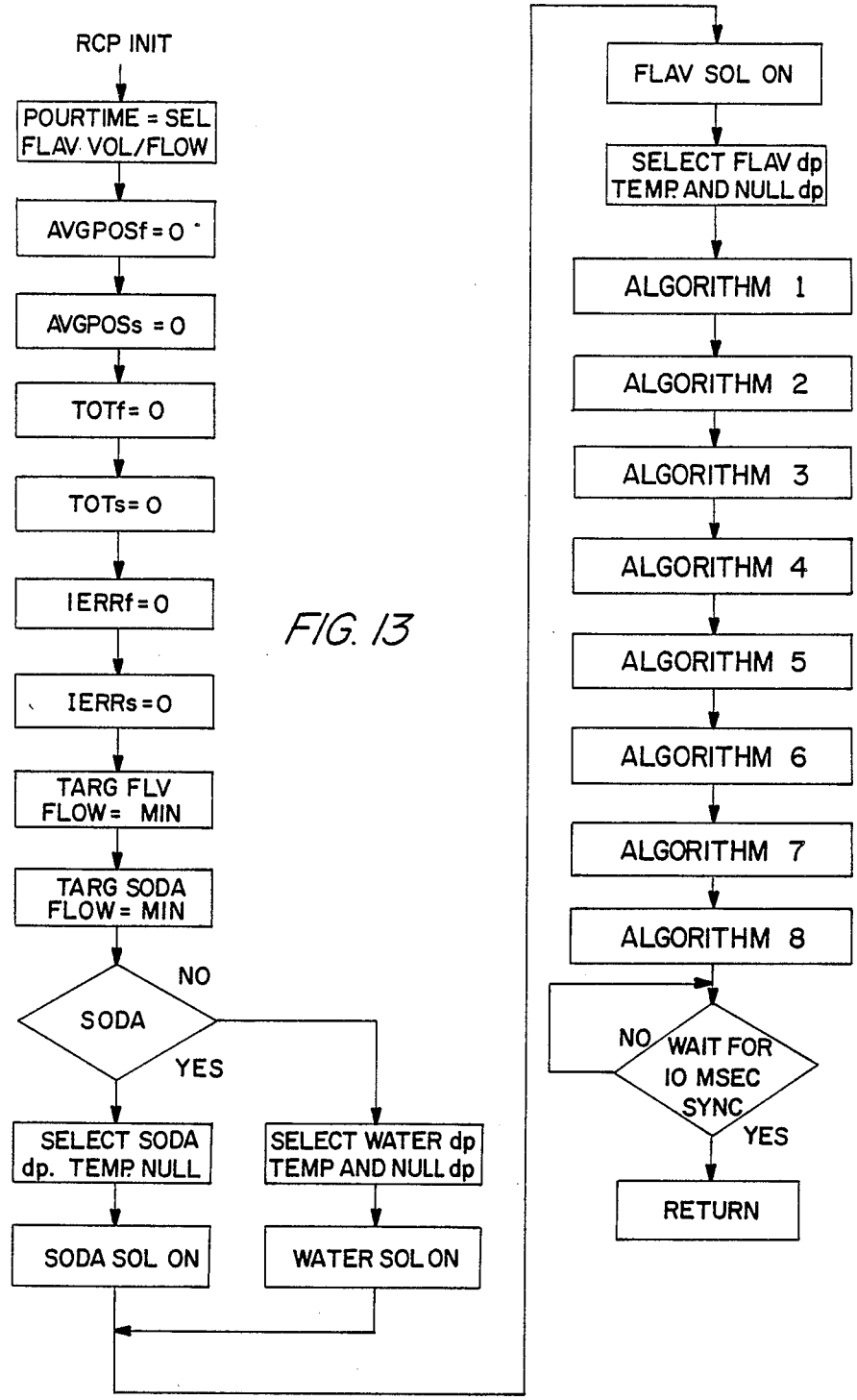

Subroutine OPT 6 is slightly different. This subroutine is a "LEARN" routine wherein the respective size selection buttons S,M,L,XL on the operator display panel OCP are energized; a beverage flavor is selected and the ratio controlled pour initialization routine for the selected flavor is run with the size button depressed until the cup is almost full. The size button can be pushed again to top off the serving as indicated in the block "Selected Flav. size=size+TOT". The amount of beverage dispensed into the cup is then displayed on display 60 and noted. Then each of the subroutines OPT 6 through OPT 9 are run to program the respective portions sizes into the microprocessors memory using the select button 62, increment button 64, decrement button 66 and display 60. The flow chart of FIG. 12 completes the programming routine. Referring to FIG. 13 there is illustrated the ratio controlled pour initialization routine as a detailed step-by-step process. In the first block of this routine the pour time is illustrated as being a function of the volume and flow rate of each respective flavor selected. The next eight blocks illustrate the initial conditions for each of the following variables:

"AVGPOS$_f$" equals the average position of the flavor motor MF of FIG. 2

"AVGPOS$_s$" equals the average position of the water motor MSW of FIG. 2

"TOTf" equals the total volume of syrup

"TOT$_s$" equals the total volume of soda water or water

"IERR$_f$" equals the integral of the error of the flavor

"IERR$_s$" equals the integral of the error of the soda water or water

"TARG FLV FLOW" is the target or reference value of flavor flow rate for a given ratio "TARG SODA FLOW" equals the target soda or water flow rate for a given ratio.

The above parameters have initial values as indicated and the values during a pour are calculated from algorithms 1 to 8 later on in this subroutine as will be explained more fully hereinafter.

At this juncture the ratio controlled pour initialization routine continues to a "soda" decision block which is an initialization control loop associated with the actuation of the soda push buttons PBS of FIG. 7. In this control loop the water flow rate or soda water flow rates are selected via the controls of panel SCP the flow rates being represented in the software routine as "dp". In a similar manner the temperature and null values are selected. Then each of the flavors selected are initialized with respect to flow rate, temperature and null positions. The routine then proceeds on to the execution of algorithms 1 through 8 which are as follows:

Algorithm 1

$$IERR_f = IERR_f + \text{Target Flavor Flow Rate} - (K_1^T + K_2^T \sqrt{dp \cdot k_3} \cdot K_4^F)$$

where
- $K_1$ = offset as a function of temperature of MPX2050 Motorola Pressure Sensors TS
- dp = Pressure Differential measured by TS
- $K_2$ = Slope as a function of temperature of Motorola Sensor TS
- $K_4$ = orifice calibration of sensor TS
- $K_1$ = Integral gain of sensors TS as function of viscosity (see algorithm 4)
- Kp = proportional gain as a function of viscosity for TS (see algorithm 2)
- $V_f$ = velocity of flavor stepper motor VF
- $V_s$ = velocity of soda/water motor VSW
- $IERR_f$ = Integral of the error of the flavor flow rate

Algorithm 2

$$V_f = IERR_f \cdot K_I^F + \text{Target flavor flow rate} - (K_1^T + K_2^T \sqrt{dp \cdot K_3} \cdot K_4^F \cdot K_p^F)$$

Note - parameters defined as above

Algorithm 3

$IERR_s$ = Integral of the error of the flavor flow rate $$IERR_s = IERR_s + \text{Target soda/water flow rate} - (K_1^T + K_2^T \sqrt{dp \cdot K_3} \cdot K_4^F)$$

Note - parameters defined as above

Algorithm 4

$$V_s = IERR_2 \cdot K_1^F + \text{Target Soda/Water flow rate} - (K_1^T + K_2^T \sqrt{dp \cdot K_3} \cdot K_4 \cdot K_p^F)$$

Note - parameters defined as above

Algorithm 5

$$TOT_f = TOT_f + (K_1^T + K_2^T \sqrt{dp \cdot K_3}) \cdot K_4^F$$

Note - parameters defined as above

Algorithm 6

$TOT_s$ = total flow of soda or water $$TOT_s = TOT_s + (K_1^F + K_2^F \sqrt{dp \cdot K_3}) \cdot K_4^F$$

Note - parameters defined as above

Algorithm 7

$AVGPOS_f$ = Average position of flavor stepper motor MF with respect to "Home" position $$AVGPOS_f = AVGPOS_f + \text{Actual POS}_f / 2$$

Actual $POS_f$ = Actual Position of motor MF

Algorithm 8

$AVGPOS_s$ = Average position of soda/water stepper motor MSW with respect to "Home" position $$AVGPOS_s = AVGPOS_s + \text{Actual AVGPOS}_S / 2$$

Actual $POS_s$ = Actual Position of Motor MSW

Figure 14:
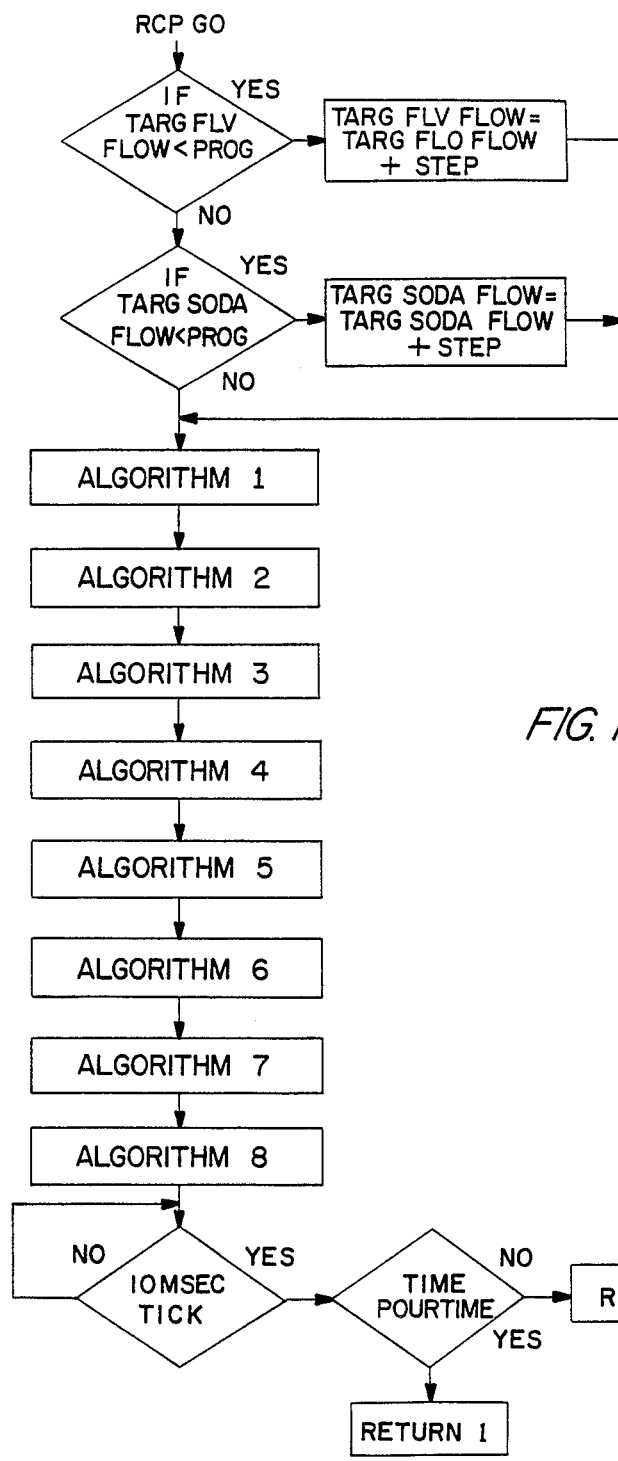
Figure 15:
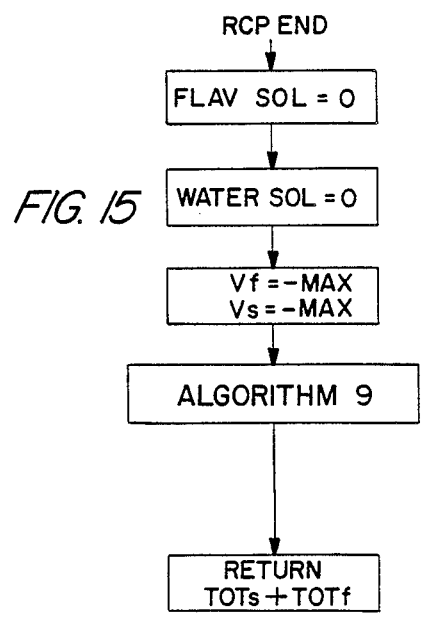

After the microprocessor calculates these algorithms, and 10 milliseconds has passed, the software returns to the main routine. Referring to FIG. 14 there is illustrated the ratio control pour go program, namely, the execution of an actual pour with appropriate ratio control routines of the present invention. That is, this flow chart illustrates the voltage ramping routine and the scaling down routine utilized when target flow rates cannot be achieved as illustrated in FIG. 15. Again referring to FIG. 14, the first control loop or loops comprise the voltage ramping subroutine. At the first decision block "if TARG FLV FLOW < PROG", if the answers is yes, the software determines if the target flavor flow rate is equal to a the target flavor flow rate plus a step increment. If the answers is no, the routine proceeds on to the decision block "if TARG SODA FLOW < PROG". If the answer is yes the flow rate is increased until the target flow rate equals the target soda flow rate plus a step increment. If the target soda flow rate is not less than the program value the routine proceeds immediately on to the calculation of the flow using algorithms 1 to 8 and after a 10 millisecond delay this subroutine is essentially terminated.

Referring to FIG. 15 there is illustrated a scaling subroutine of the present invention designated "RCP END", namely, the ratio control pour end routine. In the first two blocks of this subroutine the flavor and water solenoids are closed and no liquid is flowing. Then the flavor and solenoid motors are incremented in a negative direction at a maximum speed to the respective home positions. Then the following algorithm 9 is calculated:

Algorithm 9

Target Flow Rate = Target Flow Rate + $ADAPT(AVGPOS_f, AVGPOS_s)$

At the completion of the calculation of these algorithms the totals of water and flavor are calculated and stored.

These calculations are made in order to scale up or down the target flow rates of the flavor concentrate and diluent (soda or water) to lower values consistent with the controlled ratio and to adjust the variable reference signals (target flavor and water flow rates) downward if either the target flavor or water flow rates are never reached, whereby a controlled ratio of concentrate and diluent will be dispensed even if the selected flow rate of the mixture is never achieved.

It should be understood that the system of the present invention may be modified as would occur to one of ordinary skill in the art without departing from the spirit and scope of the present invention.

What is claimed is:

1. A system for dispensing a mixture of concentrate and diluent of a controlled ratio at or near a selected flow rate from a mixing means comprising:
   (a) concentrate supply conduit means in fluid communication with said mixing means;
   (b) diluent supply conduit means in fluid communication with said mixing means;
   (c) concentrate sensor means for determining the actual flow rate of concentrate in said concentrate supply conduit means and generating a concentrate flow rate signal;
   (d) diluent sensor means for determining the actual flow rate of diluent in said diluent supply conduit means and generating a diluent flow rate signal;
   (e) target signal generator means for generating target flow rate signals for the concentrate and the diluent in the respective conduit means, the concentrate and diluent flow rate signals being determined from the selected flow rate of the mixture at given ratios of diluent to concentrate of the mixture;

(f) reference signal generator means for generating variable reference flow rate signals associated with each of the concentrate flow rate and diluent flow rate;

(g) comparator means responsive to said concentrate flow rate sensor means and said diluent flow rate sensor means for comparing each of the concentrate and diluent flow rate signals in the respective conduit means with the associated variable reference flow rate signals and generating concentrate and diluent error signals indicative of the differences between concentrate and diluent flow rate signals and the respective associated variable reference flow rate signals;

(h) concentrate flow rate control means responsive to said concentrate error signal for changing the actual concentrate flow rate in the concentrate supply conduit means toward a value equal to the variable reference flow rate signal associated with the concentrate flow rate until the concentrate error signal equals approximately zero;

(i) diluent flow rate control means responsive to said diluent error signal for changing the actual diluent flow rate in the diluent supply conduit means toward a value equal to the variable reference flow rate associated with the diluent flow rate until the diluent error signal equals approximately zero;

(j) adjusting means for gradually varying each of the variable reference flow rate signals associated with the concentrate flow rate and diluent flow rate toward the respective target flow rate signals thereof; and (k) scaling means for scaling up or down the target flow rates of the concentrate and diluent to values consistent with the controlled ratio and causing the reference adjusting means to adjust the variable reference signals upward or downward if either the average of the concentrate error signals or the average of the diluent error signals during a predetermined time are outside of defined limits, whereby a controlled ratio of concentrate and diluent will be dispensed even if the selected flow rate of the mixture is not consistently achieved.

2. A system for dispensing a mixture of concentrate and diluent of a controlled ratio at or near a selected flow rate from a mixing means comprising:

(a) concentrate supply conduit means in fluid communication with said mixing means;

(b) diluent supply conduit means in fluid communication with said mixing means;

(c) concentrate sensor means for determining the actual flow rate of concentrate in said concentrate supply conduit means and generating a concentrate flow rate signal;

(d) diluent sensor means for determining the actual flow rate of diluent in said diluent supply conduit means and generating a diluent flow rate signal;

(e) target signal generator means for generating target flow rate signals for the concentrate and the diluent in the respective conduit means, the concentrate and diluent flow rate signals being determined from the selected flow rate of the mixture at given ratios of diluent to concentrate of the mixture;

(f) reference signal generator means for generating reference flow rate signals equal to the concentrate target flow rate and diluent target flow rate;

(g) comparator means responsive to said concentrate flow rate sensor means and said diluent flow rate sensor means for comparing each of the concentrate and diluent flow rate signals in the respective conduit means with the associated reference flow rate signals and generating concentrate and diluent error signals indicative of the differences between concentrate and diluent flow rate signals and the respective associated reference flow rate signals;

(h) concentrate flow rate control means responsive to said concentrate error signal for changing the actual concentrate flow rate in the concentrate supply conduit means toward a value equal to the reference flow rate signal associated with the concentrate flow rate until the concentrate error signal equals approximately zero;

(i) diluent flow rate control means responsive to said diluent error signal for changing the actual diluent flow rate in the diluent supply conduit means toward a value equal to the reference flow rate associated with the diluent flow rate until the diluent error signal equals approximately zero; and (j) scaling means for scaling up or down the target flow rates of concentrate and diluent to values consistent with the controlled ratio if either the average value of concentrate error signals or the average value of diluent error signals during a specified time interval are outside of defined limits;

whereby a controlled ratio of concentrate and diluent will be dispensed even if the selected flow rate of the mixture is not consistently achieved.

3. A system for dispensing a mixture of concentrate and diluent of a controlled ratio at or near a selected flow rate from a mixing means comprising:

(a) concentrate supply conduit means in fluid communication with said mixing means;

(b) diluent supply conduit means in fluid communication with said mixing means;

(c) concentrate sensor means for determining the actual flow rate of concentrate in said concentrate supply conduit means and generating a concentrate flow rate signal;

(d) diluent sensor means for determining the actual flow rate of diluent in said diluent supply conduit means and generating a diluent flow rate signal;

(e) target signal generator means for generating target flow rate signals for the concentrate and the diluent in the respective conduit means, the concentrate and diluent flow rate signals being determined from the selected flow rate of the mixture at given ratios of diluent to concentrate of the mixture;

(f) reference signal generator means for generating variable reference flow rate signals associated with each of the concentrate flow rate and diluent flow rate;

(g) comparator means responsive to said concentrate flow rate sensor means and said diluent flow rate sensor means for comparing each of the concentrate and diluent flow rate signals in the respective conduit means with the associated variable reference flow rate signals and generating concentrate and diluent error signals indicative of the differences between concentrate and diluent flow rate signals and the respective associated variable reference flow rate signals;

(h) concentrate flow rate control means responsive to said concentrate error signal for changing the actual concentrate flow rate in the concentrate supply conduit means toward a value equal to the variable reference flow rate signal associated with the concentrate flow rate until the concentrate error signal equals approximately zero;

(i) diluent flow rate control means responsive to said diluent error signal for changing the actual diluent flow rate in the diluent supply conduit means toward a value equal to the variable reference flow rate associated with the diluent flow rate until the diluent error signal equals approximately zero; and (j) adjusting means for gradually varying each of the variable reference flow rate signals associated with the concentrate flow rate and diluent flow rate toward the respective target flow rate signals thereof.

4. A system for dispensing a liquid at a desired controlled flow rate through a conduit comprising:

(a) sensor means for determining the actual flow rate of liquid in the conduit and generating a flow rate signal;

(b) target signal generator means for generating a target flow rate signal for the liquid in the conduit;

(c) reference signal generator means for generating variable reference flow rate signals associated with the desired liquid flow rate;

(d) comparator means responsive to said flow rate sensor means for comparing the liquid flow rate signals with the variable reference flow rate signals and generating error signals indicative of the differences between the liquid flow rate signals and the variable reference flow rate signals;

(e) flow rate control means responsive to said error signals for changing the actual flow rate in the conduit toward a value equal to the variable reference flow rate signal until the error signal equals approximately zero; and (f) adjusting means for gradually varying the variable reference flow rate signals from a value below the target flow rate signal toward the target flow rate signal.

5. The system of claims 1, 2, 3 or 4 wherein said concentrate flow rate control means and diluent flow rate control means each comprise:

a flow rate control assembly for selectively controlling the flow rate of a plurality of liquids including, (a) a plurality of flow passages for said plurality of liquids;

(b) a common bore intersecting each of said flow passages;

(c) a movable valve element in said bore having a plurality of flow channels therethrough, one channel for each flow passage, said channels being alignable in controlled degrees with said flow channels between fully aligned and fully unaligned positions;

(d) a single motor for moving the channels of said valve element in said controlled degrees between said fully aligned positions and said fully unaligned positions to control the flow rate of liquid through each flow passage;

(e) a valve in each of said flow passages having an open position and a closed position for initiating or stopping flow, respectively, in the associated passage; and (f) selector means for selectively opening one of said valves in the respective flow passages and closing the others to enable said single motor and valve element in the common bore to control the flow rate of liquid in the flow passage having the open valve therein.

6. The assembly of claim 5 wherein said movable valve element includes a rotary valve spool in said common bore having said flow channels disposed transversely to a longitudinal axis thereof.

7. The assembly of claim 6 wherein said single motor is a rotary stepper motor.

8. The assembly of claim 7 wherein said stepper motor is a variable speed motor.

9. The assembly of claim 8 wherein said valve is a solenoid valve.

10. The assembly of claim 8 wherein said flow rate sensor means are located in each of said flow passages for sensing liquid flow rates therein and generate control signals to said single motor to control the position of said movable valve element.

11. The assembly of claim 10 wherein said flow rate sensor means comprises:

a disk disposed in the flow passage having an orifice therein of a predetermined size, said orifice causing a pressure differential in the liquid between opposite sides of the disk; and pressure sensor means for measuring said pressure differential and converting it to an electrical control signal proportional to the flow rate of the liquid.

12. The system of claim 5 wherein said rotary valve spool has alternate lands and grooves, said channels being formed in every other land, and liquid seals are provided in each groove, said common bore having bleed holes communicating transversely therewith to the atmosphere in positions opposite to the lands not having said channels therethrough, whereby a faulty liquid seal permits venting of leaking liquid to the atmosphere rather than to an adjacent flow passage.

13. A flow rate control assembly for selectively controlling the flow rate of a plurality of liquids comprising:

(a) a plurality of flow passages for said plurality of liquids;

(b) a common bore intersecting each of said flow passages;

(c) a movable valve element in said bore having a plurality of flow channels therethrough, one channel for each flow passage, said channels being alignable in controlled degrees with said flow channels, between fully aligned and fully unaligned positions;

(d) a single motor for moving the channels of said valve element in said controlled degrees between said fully aligned positions and said fully unaligned positions to control the flow rate of liquid through each flow passage;

(e) a valve in each of said flow passages having an open position and a closed position for initiating or stopping flow, respectively, in the associated passage; and (f) selector means for selectively opening one of said valves in the respective flow passages and closing the others to enable said single motor and valve element in the common bore to control the flow rate of liquid in the flow passage having the valve therein.

14. The assembly of claim 13 wherein said movable valve element includes a rotary valve spool in said common bore having said flow channels disposed transversely to a longitudinal axis thereof.

15. The assembly of claim 14 wherein said single motor is a rotary stepper motor.

16. The assembly of claim 15 wherein said stepper motor is a variable speed motor.

17. The assembly of claim 16 further including flow rate sensor means in each of said flow passages for sensing liquid flow rates therein and generating control signals to said single motor to control the position of said movable valve element.

18. The assembly of claim 17 wherein said flow rate sensor means comprises:
 a disk disposed in the flow passage having an orifice therein of a predetermined size, said orifice causing a pressure differential in the liquid between opposite sides of the disk; and
 pressure sensor means for measuring said pressure differential and converting it to an electrical control signal proportional to the flow rate of the liquid.

19. The assembly of claim 16 wherein said valve is a solenoid valve.

20. The assembly of claims 14 or 18 wherein said rotary valve spool has alternate lands and grooves, said channels being formed in every other land, and liquid seals are provided in each groove, said common bore having bleed holes communicating transversely therewith to the atmosphere in positions opposite to the lands not having said channels therethrough,
 whereby a faulty liquid seal permits venting of leaking liquid to the atmosphere rather than to an adjacent flow passage.

21. A method for dispensing a mixture of concentrate and diluent of a controlled ratio at or near a selected flow rate from a mixing means comprising the steps of:
 (a) providing a concentrate supply conduit means in fluid communication with said mixing means;
 (b) providing a diluent supply conduit means in fluid communication with said mixing means;
 (c) determining the actual flow rate of concentrate in said concentrate supply conduit means and generating a concentrate flow rate signal;
 (d) determining the actual flow rate of diluent in said diluent supply conduit means and generating a diluent flow rate signal;
 (e) generating target flow rate signals for the concentrate and the diluent in the respective conduit means, the concentrate and diluent flow rate signals being determined from the selected flow rate of the mixture at given ratios of diluent to concentrate of the mixture;
 (f) generating variable reference flow rate signals associated with each of the concentrate flow rate and diluent flow rate;
 (g) comparing each of the concentrate and diluent flow rate signals in the respective conduit means with the associated variable reference flow rate signals and generating concentrate and diluent error signals indicative of the differences between concentrate and diluent flow rate signals and the respective associated variable reference flow rate signals;
 (h) changing the actual concentrate flow rate in the concentrate supply conduit means toward a value equal to the variable reference flow rate signal associated with the concentrate flow rate until the concentrate error signal equals approximately zero;
 (i) changing the actual diluent flow rate in the diluent supply conduit means toward a value equal to the variable reference flow rate associated with the diluent flow rate until the diluent error signal equals approximately zero;
 (j) gradually varying each of the variable reference flow rate signals associated with the concentrate flow rate and diluent flow rate toward the respective target flow rate signals thereof; and
 (k) scaling up or down the target flow rates of the concentrate and diluent to values consistent with the controlled ratio and causing the reference adjusting means to adjust the variable reference signals upward or downward if either the average value of the concentrate error signals or the average value of the diluent error signals during a specified time interval are outside of designated limits, whereby a controlled ratio of concentrate and diluent will be dispensed even if the selected flow rate of the mixture is not consistently achieved.

22. A method for dispensing a mixture of concentrate and diluent of a controlled ratio at or near a selected flow rate from a mixing means comprising the steps of:
 (a) providing a concentrate supply conduit means in fluid communication with said mixing means;
 (b) providing a diluent supply conduit means in fluid communication with said mixing means;
 (c) determining the actual flow rate of concentrate in said concentrate supply conduit means and generating a concentrate flow rate signal;
 (d) determining the actual flow rate of diluent in said diluent supply conduit means and generating a diluent flow rate signal;
 (e) generating target flow rate signals for the concentrate and the diluent in the respective conduit means, the concentrate and diluent flow rate signals being determined from the selected flow rate of the mixture at given ratios of diluent to concentrate of the mixture;
 (f) generating reference flow rate signals equal to the concentrate target flow rate and diluent target flow rate;
 (g) comparing each of the concentrate and diluent flow rate signals in the respective conduit means with the associated reference flow rate signals and generating concentrate and diluent error signals indicative of the differences between concentrate and diluent flow rate signals and the respective associated reference flow rate signals;
 (h) changing the actual concentrate flow rate in the concentrate supply conduit means toward a value equal to the reference flow rate signal associated with the concentrate flow rate until the concentrate error signal equals approximately zero;
 (i) changing the actual diluent flow rate in the diluent supply conduit means toward a value equal to the reference flow rate associated with the diluent flow rate until the diluent error signal equals approximately zero; and
 (j) scaling up or down the target flow rates of concentrate and diluent to values consistent with the controlled ratio if either the average value of the concentrate error signals or the average value of the diluent error signals during a specified interval of time are outside of designated limits;

whereby a controlled ratio of concentrate and diluent will be dispensed even if the selected flow rate of the mixture is not consistently achieved.

23. A method for dispensing a mixture of concentrate and diluent of a controlled ratio at or near a selected flow rate from a mixing means comprising the steps of:
   (a) providing a concentrate supply conduit means in fluid communication with said mixing means;
   (b) providing a diluent supply conduit means in fluid communication with said mixing means;
   (c) determining the actual flow rate of concentrate in said concentrate supply conduit means and generating a concentrate flow rate signal
   (d) determining the actual flow rate of diluent in said diluent supply conduit means and generating a diluent flow rate signal;
   (e) generating target flow rate signals for the concentrate and the diluent in the respective conduit means, the concentrate and diluent flow rate signals being determined from the selected flow rate of the mixture at given ratios of diluent to concentrate of the mixture;
   (f) generating variable reference flow rate signals associated with each of the concentrate flow rate and diluent flow rate;
   (g) comparing each of the concentrate and diluent flow rate signals in the respective conduit means with the associated variable reference flow rate signals and generating concentrate and diluent error signals indicative of the differences between concentrate and diluent flow rate signals and the respective associated variable reference flow rate signals;
   (h) changing the actual concentrate flow rate in the concentrate supply conduit means toward a value equal to the variable reference flow rate signal associated with the concentrate flow rate until the concentrate error signal equals approximately zero;
   (i) changing the actual diluent flow rate in the diluent supply conduit means toward a value equal to the variable reference flow rate associated with the diluent flow rate until the diluent error signal equals approximately zero; and
   (j) gradually varying each of the variable reference flow rate signals associated with the concentrate flow rate and diluent flow rate toward the respective target flow rate signals thereof.

24. A method for dispensing a liquid at a desired controlled flow rate through a conduit comprising:
   (a) determining the actual flow rate of liquid in the conduit and generating a flow rate signal;
   (b) generating target flow rate signal for the liquid in the conduit;
   (c) reference signal generator means for generating variable reference flow rate signals associated with the desired controlled liquid flow rate;
   (d) comparing the liquid flow rate signals with the variable reference flow rate signals and generating error signals indicative of the differences between the liquid flow rate signals and the variable reference flow rate signals;
   (e) changing the actual flow rate in the conduit toward a value equal to the variable reference flow rate signal until the error signal equals approximately zero; and
   (f) gradually varying the variable reference flow rate signals toward the target flow rate signal.

* * * * *